United States Patent [19]

Furukawa et al.

[11] Patent Number: 5,112,704
[45] Date of Patent: May 12, 1992

[54] NON-AQUEOUS ELECTROLYTE CELL

[75] Inventors: Nobuhiro Furukawa; Seiji Yoshimura; Masatoshi Takahashi, all of Osaka, Japan

[73] Assignee: Sanyo Electric Co., Ltd., Osaka, Japan

[21] Appl. No.: 492,267

[22] Filed: Feb. 28, 1990

Related U.S. Application Data

[63] Continuation of Ser. No. 267,591, Nov. 7, 1988, abandoned.

[30] Foreign Application Priority Data

Jul. 1, 1988 [JP] Japan ................. 63-165724
Jul. 1, 1988 [JP] Japan ................. 63-165725
Jul. 1, 1988 [JP] Japan ................. 63-165726

[51] Int. Cl.$^5$ ............... H01M 6/14; H01M 4/58
[52] U.S. Cl. ........................ 429/194; 429/197
[58] Field of Search ...................... 429/194, 197

[56] References Cited

U.S. PATENT DOCUMENTS

| 3,769,092 | 10/1973 | Dechenaux | 136/100 |
|---|---|---|---|
| 4,056,663 | 11/1977 | Schlaiker . | |
| 4,129,691 | 12/1978 | Broussely | 429/197 |
| 4,142,028 | 2/1979 | Leger et al. | 429/194 |
| 4,279,972 | 7/1981 | Moses | 429/50 |
| 4,419,423 | 12/1983 | Leger | 429/197 |
| 4,482,613 | 11/1984 | Turchan et al. | 429/53 |
| 4,585,715 | 4/1986 | Marple | 429/194 |
| 4,804,595 | 2/1989 | Bakos et al. | 429/197 |
| 4,804,597 | 2/1989 | Tahara et al. | 429/197 |

FOREIGN PATENT DOCUMENTS

| 0030868 | 6/1981 | European Pat. Off. ............ 429/197 |
|---|---|---|
| 0262846 | 4/1988 | European Pat. Off. . |
| 0270264 | 6/1988 | European Pat. Off. . |
| 0329271 | 8/1989 | European Pat. Off. . |
| 3129634 | 4/1982 | Fed. Rep. of Germany . |
| 2252658 | 6/1975 | France . |
| 2378361 | 8/1978 | France . |
| 60-86771 | 5/1985 | Japan . |
| 60-243972 | 12/1985 | Japan . |

OTHER PUBLICATIONS

Patent Abstracts of Japan, vol. 11, No. 374 (E-562)(2821), Dec. 5, 1987.
JP-A-62 143 372 (Matsushita Electric Ind. Co. Ltd.) 26-06-1987.

Primary Examiner—Brian E. Hearn
Assistant Examiner—Maria Nuzzolillo
Attorney, Agent, or Firm—Armstrong & Kubovcik

[57] ABSTRACT

A non-aqueous electrolyte cell having a positive electrode, a negative electrode and an electrolyte contained in a cell can, the electrolyte including a solute and an organic solvent, the solute comprising lithium trifluoromethanesulfonate. The organic solvent comprises an organic solvent mixture of at least two high boiling point solvents including at least one cyclic carbonates. The negative electrode comprises a lithium alloy. The electrolyte includes a reaction inhibitor added thereto for inhibiting reaction between the cell can and the electrolyte. Further, the lithium trifluoromethanesulfonate is heated, dried and dehydrated in a vacuum at 80°–150° C.

10 Claims, 33 Drawing Sheets

NON-AQUEOUS ELECTROLYTE CELL

This application is a continuation of application Ser. No. 267,591 filed Nov. 7, 1988 now abandoned.

BACKGROUND OF THE INVENTION (1) Field of the Invention

The present invention relates to a non-aqueous electrolyte cell comprising a positive electrode, a negative electrode, and an electrolyte consisting of a solute and an organic solvent, all contained in a cell can, in which lithium trifluoromethanesulfonate is employed as the solute.

(2) Description of the Prior Art

A non-aqueous electrolyte cell in which the negative electrode has lithium, sodium or an alloy thereof as an active material provides the advantages of high energy density and low self-discharge rate. However, this type of cell is inferior in low temperature discharge characteristics and has room for improvement in this respect.

In view of the above situation, proposals have been made to improve the low temperature discharge characteristics of the lithium cell by using lithium trifluoromethanesulfonate ($LiCF_3SO_3$) as the solute, which is highly soluble in a non-aqueous solvent and does not cause deposition of lithium salt on the negative electrode during low temperature discharge.

Where lithium trifluoromethanesulfonate is used as the solute, initial low temperature discharge characteristics are improved but there is a problem of deterioration in low temperature discharge characteristics after a long storage period. The deterioration takes place for the following reasons:

(1) When this type of cell is stored for a long period, a reaction occurs between fluorine ionized from lithium trifluoromethanesulfonate and the lithium which is the active material of the negative electrode. As a result, a layer of lithium fluoride which is a passive substance is formed on the negative electrode surface, thereby increasing internal resistance of the electrode.

(2) A cell can becomes corroded during the storage period due to fluorine ionized from lithium trifluoromethanesulfonate, and metallic ions formed by the corrosion deposit on the negative electrode surface, thereby increasing internal resistance of the electrode.

Meanwhile, the following cells have been proposed:

(1) Cells in which the electrolyte includes a solvent mixture of propylene carbonate and 1,2-dimethoxyethane (U.S. Pat. Nos. 4,279,972 and 4,482,613); a cell in which the electrolyte includes a solvent mixture of propylene carbonate, 1,2-dimethoxyethane and 1,3-dioxolane (U.S. Pat. No. 4,129,691); a cell in which the electrolyte includes a solvent consisting of dimethylformamide (U.S. Pat. No. 4,142,028); a cell in which the electrolyte includes a solvent mixture of propylene carbonate and tetrahydrofuran (Japanese Patent Publication Kokai No. 60-243972); and a cell in which the electrolyte includes a solute consisting of lithium perchlorate and a solvent mixture of propylene carbonate and 1,2-dimethoxyethane (Japanese Patent Publication Kokai No. 60-86771).

(2) A cell having a can formed of stainless steel, and in particular ferritic stainless steel containing almost no nickel.

However, the cells listed in paragraph (1) above do not provide sufficient improvement in the low temperature discharge characteristics after storage yet.

The cell in paragraph (2) fails to solve the problem of metal corrosion to the full extent.

Thus the cells proposed heretofore do not provide sufficient improvement in the low temperature discharge characteristics after storage.

SUMMARY OF THE INVENTION

A primary object of the present invention, therefore, is to provide a non-aqueous electrolyte cell having excellent low temperature discharge characteristics after a long storage period.

Another object of the invention is to provide a non-aqueous electrolyte cell having excellent high rate discharge characteristics after a long storage period.

These objects are fulfilled, according to the present invention by a non-aqueous electrolyte cell having a positive electrode, a negative electrode and an electrolyte contained in a cell can, the electrolyte including a solute and an organic solvent, the solute comprising lithium trifluoromethanesulfonate, wherein the organic solvent comprises an organic solvent mixture of at least two high boiling point solvents including at least one cyclic carbonates.

The above objects are fulfilled also by a non-aqueous electrolyte cell having a positive electrode, a negative electrode and an electrolyte contained in a cell can, the electrolyte including a solute and an organic solvent, the solute comprising lithium trifluoromethanesulfonate, wherein the negative electrode comprises a lithium alloy.

Further, the objects of the present invention are fulfilled by a non-aqueous electrolyte cell having a positive electrode, a negative electrode and an electrolyte contained in a cell can, the electrolyte including a solute and an organic solvent, the solute comprising lithium trifluoromethanesulfonate, wherein the electrolyte includes a reaction inhibitor added thereto for inhibiting reaction between the cell can and the electrolyte.

Still further, the objects of the invention are fulfilled by a non-aqueous electrolyte cell having a positive electrode, a negative electrode and an electrolyte contained in a cell can, the electrolyte including a solute and an organic solvent, the solute comprising lithium trifluoromethanesulfonate, wherein the lithium trifluoromethanesulfonate is heated, dried and dehydrated in a vacuum at 80°–150° C.

The organic solvent mixture may comprise ethylene carbonate, butylene carbonate and 1,2-dimethoxyethane.

Further, the organic solvent mixture may comprise ethylene carbonate, γ-butyrolactone and 1,2-dimethoxyethane.

The organic solvent mixture may comprise propylene carbonate, sulfolane and tetrahydrofuran.

The organic solvent may include at least two cyclic carbonates.

The lithium alloy may be selected from the group consisting of lithium-aluminum alloy, lithium-indium alloy, lithium-tin alloy, lithium-lead alloy, lithium-bismuth alloy, lithium-gallium alloy, lithium-strontium alloy, lithium-silicon alloy, lithium-zinc alloy, lithium-cadmium alloy, lithium-calcium alloy and lithium-barium alloy.

The reaction inhibitor may be selected from the group consisting of lithium nitrate, triethyl phosphate, tri-n-butyl phosphate, NNN'N'-tetramethyl ethylenediamine, 1,2-diphenyl ethylenediamine, diethyldithiocarbamin, triethyl phosphate, ammonium hypophosphite, and urea orthophosphite.

The foregoing objects of the present invention are fulfilled for the following reasons:

(1) Where the organic solvent comprises an organic solvent mixture of at least two high boiling point solvents including at least one cyclic carbonates, films of lithium carbonate are formed on surfaces of the negative electrode, and these films suppress reaction between the negative electrode and the electrolyte. Consequently, the negative electrode surfaces remain free from formation of passive films of lithium fluoride, thereby suppressing an increase in the internal resistance of the electrode. As a result, the low temperature discharge characteristics after a long period of storage are improved.

The above organic solvent mixture is also effective to prevent lowering of the conductivity, whereby the cell has excellent high rate discharge characteristics after a long storage period.

Where the electrolyte includes two cyclic carbonates, a solvent of high conductivity and high viscosity and a solvent of low conductivity and low viscosity may be mixed in a suitable ratio to realize optimal conductivity and viscosity levels for high rate discharge. This further improves the high rate discharge characteristics after storage.

(2) Where the negative electrode comprises a lithium alloy which is lower in activity than lithium used alone, reaction between fluorine ions from lithium trifluoromethanesulfonate and lithium in the lithium alloy is suppressed even when the cell is stored for a long period. Thus, there is little possibility of passive films being formed on the negative electrode surfaces, whereby low temperature discharge characteristics after a long storage period are improved.

(3) Where the electrolyte includes a reaction inhibitor (specifically, a phosphorus compound or a nitrogen compound) added thereto for inhibiting reaction between the cell can and the electrolyte, corrosion of the cell can is suppressed during storage even if lithium trifluoromethanesulfonate is used as the solute. Thus, the cell is superior in not only initial but post-storage low temperature discharge characteristics.

Other objects, features and advantages of the present invention will be apparent from the following description.

DETAILED DESCRIPTION OF THE PREFERRED EMBODIMENTS

First Embodiment (Example)

Figure 1:
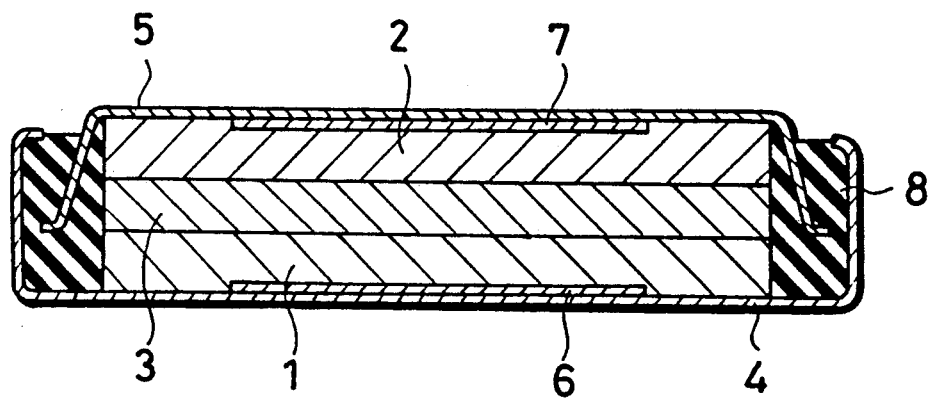
FIG. 1 is a sectional view of a non-aqueous electrolyte cell according to the present invention.

An embodiment of the present invention will be described with reference to a flat type non-aqueous electrolyte cell as shown in FIG. 1.

The cell comprises a negative electrode 2 formed of lithium metal and pressed upon an inside surface of a negative collector 7. The negative collector 7 is secured to a bottom inside surface of a negative can 5 formed of ferritic stainless steel (SUS 430) and having an approximately U-shaped section. The negative can 5 is peripherally secured in an insulating packing 8 formed of polypropylene, while a positive can 4 formed of stainless steel and having an approximately U-shaped section oriented opposite to the negative can 5 is secured peripherally of the insulating packing 8. A positive collector 6 is secured to a bottom inside surface of the positive can 4, and a positive electrode 1 is secured to an inside surface of the positive collector 6. A separator 3 impregnated with an electrolyte is disposed between the positive electrode 1 and the negative electrode 2.

The positive electrode 1 employs manganese dioxide heat-treated in a temperature range of 350°–430° C. to act as an active material. This manganese dioxide was mixed with carbon powder acting as a conductive agent and fluororesin powder acting as a binding agent in the ratio by weight of 85:10:5. The mixture was molded under pressure, and then heat-treated at 250°–350° C., thereby resulting in the positive electrode 1. The negative electrode 2 was produced by punching a piece having a selected size out of a rolled plate of lithium.

The electrolyte comprises 1 mol/lit. of lithium trifluoromethanesulfonate ($LiCF_3SO_3$) dissolved in a solvent mixture of ethylene carbonate, butylene carbonate and 1,2-dimethoxyethane mixed in the a volume ratio of 2:2:6. This electrolyte contains no additive. The cell is 20 mm in diameter and 2.5 mm in thickness, and has a capacity of 130 mAH.

The cell manufactured as above is hereinafter called Cell A.

(Comparative Example I)

A cell was manufactured, for comparison purposes, in the same way as above excepting that the electrolyte here comprised a solvent including ethylene carbonate and 1,2-dimethoxyethane mixed in the a volume ratio of 4:6.

This cell is hereinafter called Cell V1.

(Comparative Example II)

Another cell was manufactured in the same way as above excepting that the electrolyte here comprised a solvent including butylene carbonate and 1,2-dimethoxyethane mixed in the a volume ratio of 4:6.

This cell is hereinafter called Cell V2.

Table 1 below shows particulars of the various components of Cells A, V1 and V2.

TABLE 1

| | Cell | | |
|---|---|---|---|
| | A | V1 | V2 |
| P. Electrode | $MnO_2$ | $MnO_2$ | $MnO_2$ |
| N. Electrode | Li | Li | Li |
| Electrolyte | | | |
| Solvent | EC + BC + DME | EC + DME | BC + DME |
| Solute | $LiCF_3SO_3$ | $LiCF_3SO_3$ | $LiCF_3SO_3$ |
| Additive | None | None | None |

(Experiment I)

Figure 2:
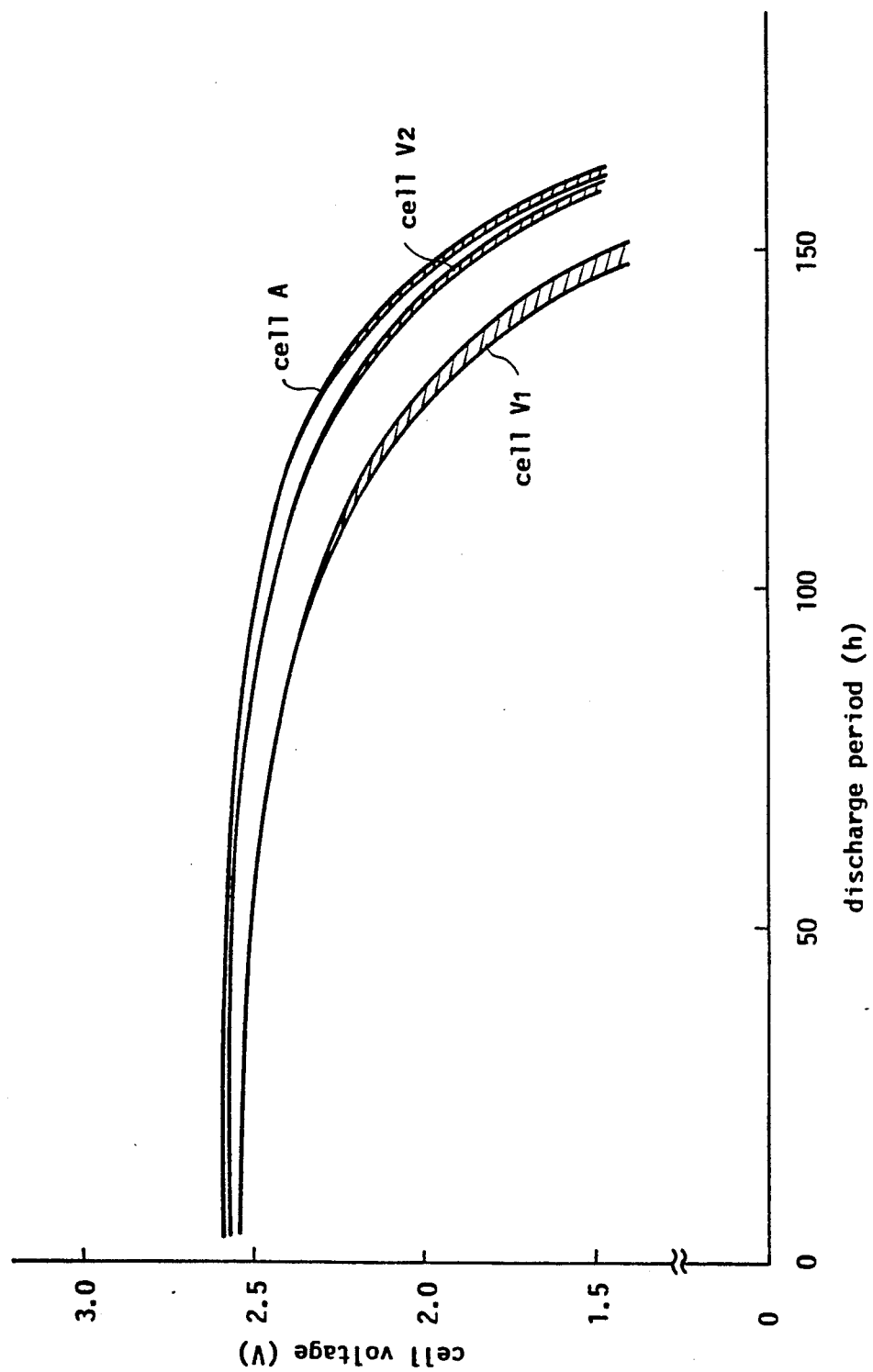
FIG. 2 is a graph showing initial low temperature discharge characteristics of Cell A according to the invention, Comparative Cell V1 and Comparative Cell V2.
Figure 3:
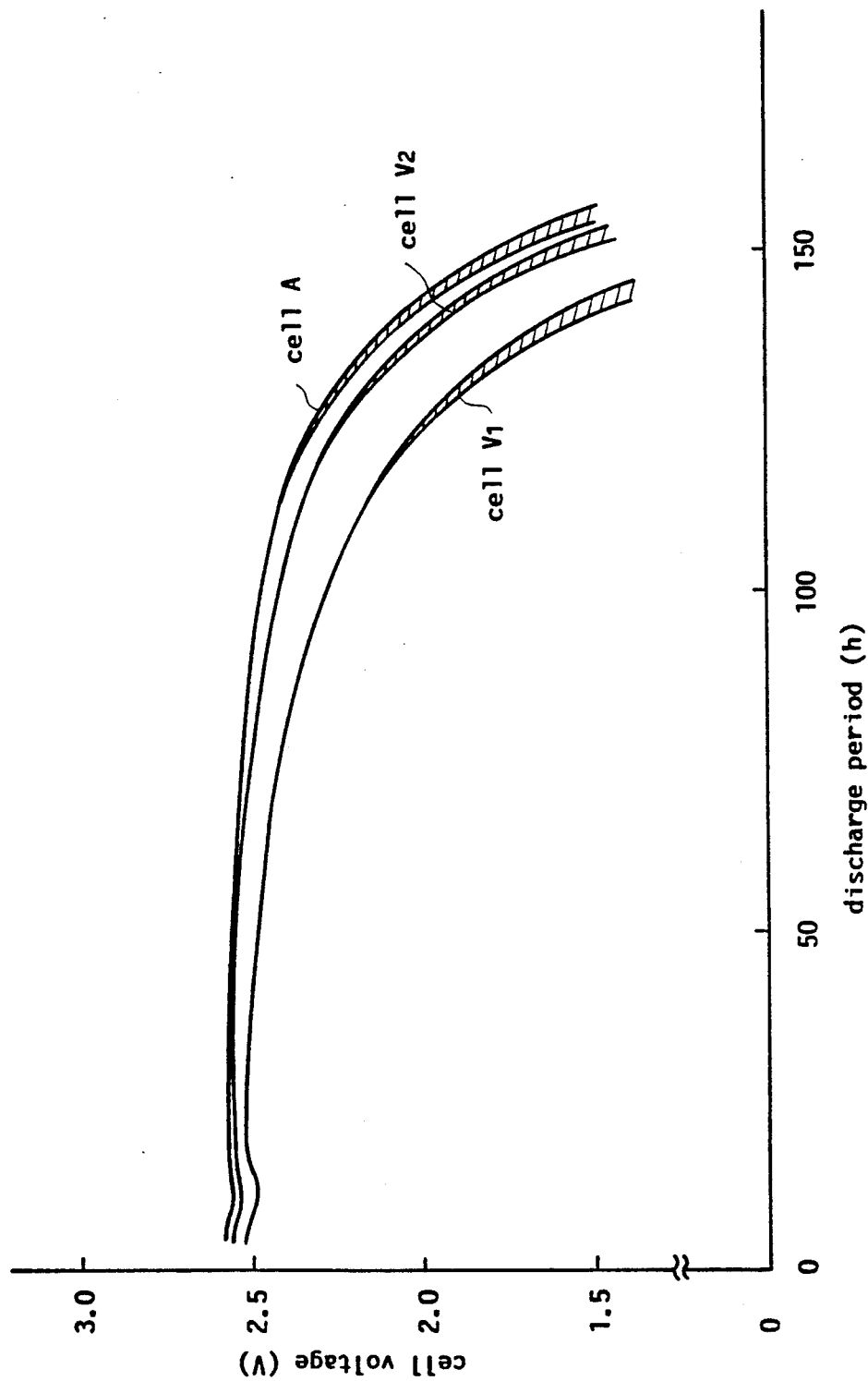
FIG. 3 is a graph showing post-storage low temperature discharge characteristics of Cells A, V1 and V2.

Initial and post-storage low temperature discharge characteristics of Cells A of the present invention and Comparative Cells V1 and V2 were checked, and the results are shown in FIGS. 2 and 3. FIG. 2 shows low temperature discharge characteristics observed when the cells were discharged at a temperature of −20° C. and with a load of 3KΩ immediately after assembly. FIG. 3 shows low temperature discharge characteristics observed when the cells were discharged at the temperature of −20° C. and with the load of 3KΩ after storing the cells for three months at a temperature of 60° C. (which corresponds to storage for 4 and half years at room temperature) following their assembly.

As seen from FIGS. 2 and 3, Cell A of the present invention is superior to Comparative Cells V1 and V2 in both initial and post-storage low temperature discharge characteristics.

(Experiment II)

Figure 4:
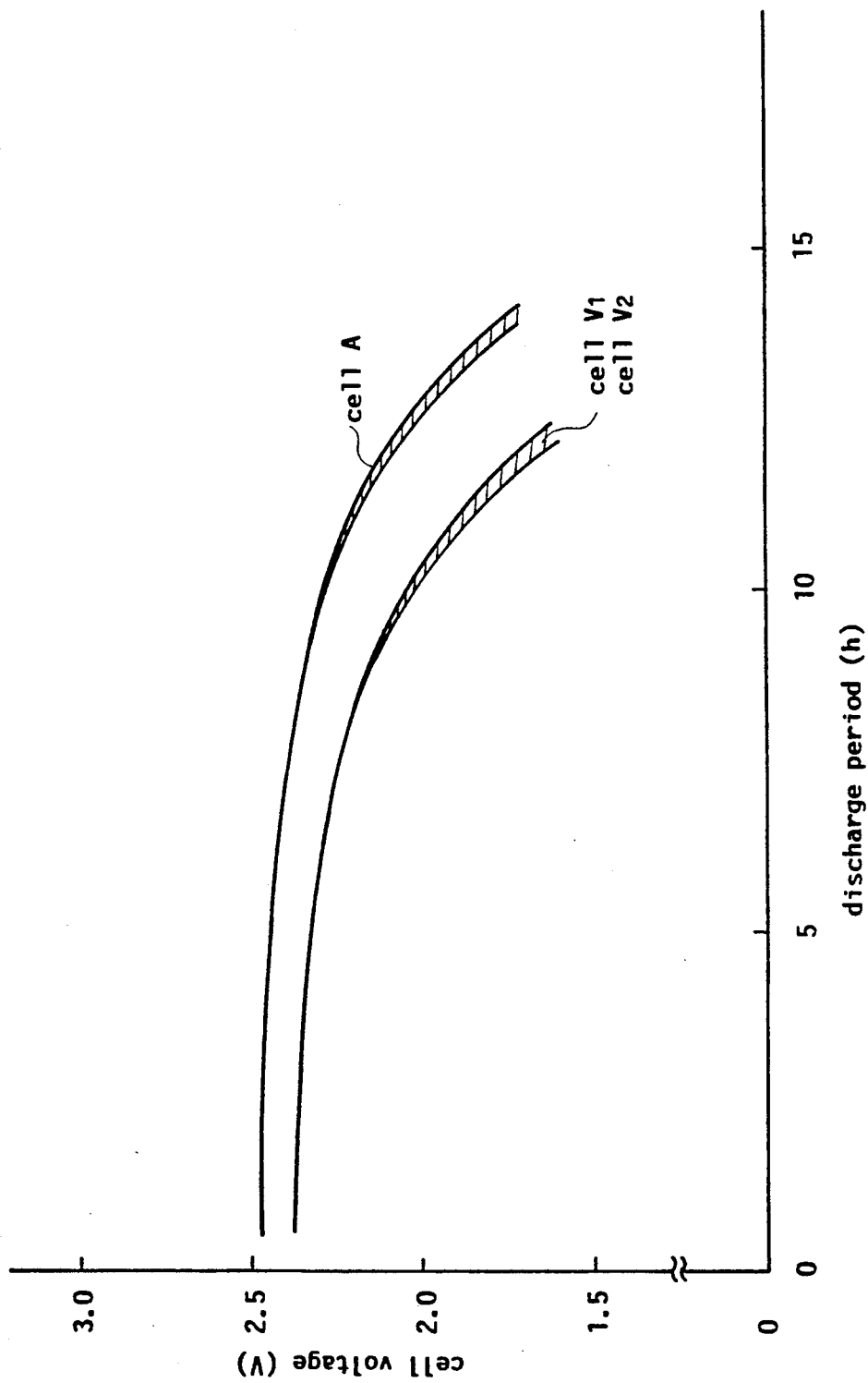
FIG. 4 is a graph showing initial high rate discharge characteristics of Cells A, V1 and V2.
Figure 5:
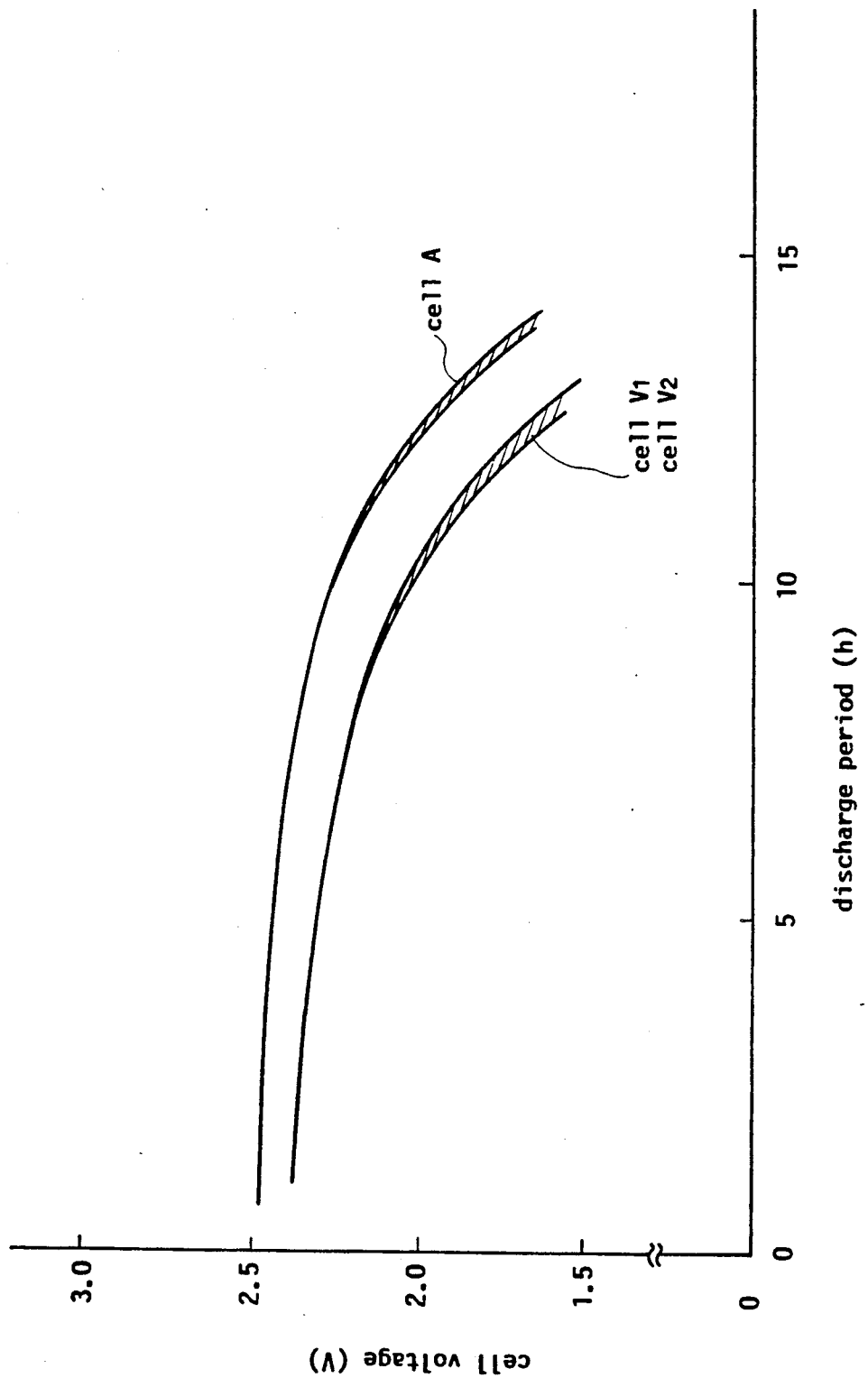
FIG. 5 is a graph showing high rate discharge characteristics after storage of Cells A, V1 and V2.

Initial and post-storage high rate discharge characteristics of Cells A, V1 and V2 were checked, and the results are shown in FIGS. 4 and 5. FIG. 4 shows high rate discharge characteristics observed when the cells were discharged at a temperature of 25° C. and with a load of 300Ω immediately after assembly. FIG. 5 shows high rate discharge characteristics observed when the cells were discharged at the temperature of 25° C. and with the load of 300Ω after storing the cells for three months at the temperature of 60° C. following their assembly.

As seen from FIGS. 4 and 5, Cell A of the present invention is superior to Comparative Cells V1 and V2 in both initial and post-storage high rate discharge characteristics.

Second Embodiment (Example)

A cell was manufactured in the same way as the example in the first embodiment excepting that the electrolyte used here comprised a solvent including ethylene carbonate, γ-butyrolactone and 1,2-dimethoxyethane mixed in a volume ratio of 2:2:6.

The cell manufactured as above is hereinafter called Cell B.

(Comparative Example I)

Comparative Cell V1 used in the first embodiment is also used here.

(Comparative Example II)

A cell was manufactured in the same way as the example in the first embodiment excepting that the electrolyte here comprised a volume solvent including γ-butyrolactone and 1,2-dimethoxyethane mixed in the ratio of 4:6.

This cell is hereinafter called Cell V3.

Table 2 below shows particulars of the various components of Cells B, V1 and V3.

TABLE 2

|  | Cell | | |
| --- | --- | --- | --- |
|  | B | V1 | V3 |
| P. Electrode | MnO$_2$ | MnO$_2$ | MnO$_2$ |
| N. Electrode | Li | Li | Li |
| Electrolyte |  |  |  |
| Solvent | EC + γ-BL + DME | EC + DME | δ-BL + DME |
| Solute | LiCF$_3$SO$_3$ | LiCF$_3$SO$_3$ | LiCF$_3$SO$_3$ |
| Additive | None | None | None |

(Experiment I)

Figure 6:
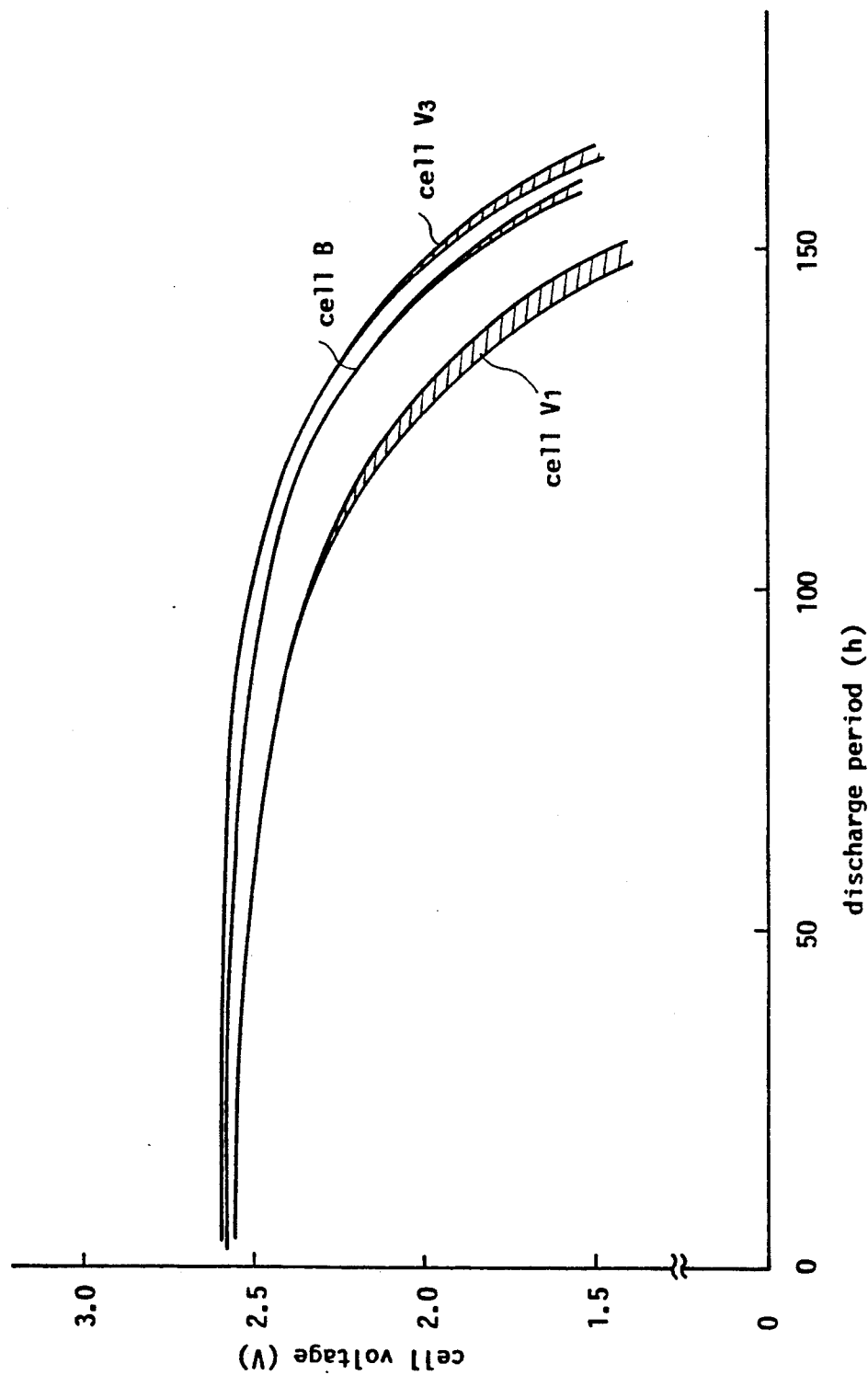
FIG. 6 is a graph showing showing initial low temperature discharge characteristics of Cell B according to the invention, Comparative Cell V1 and Comparative Cell V3.
Figure 7:
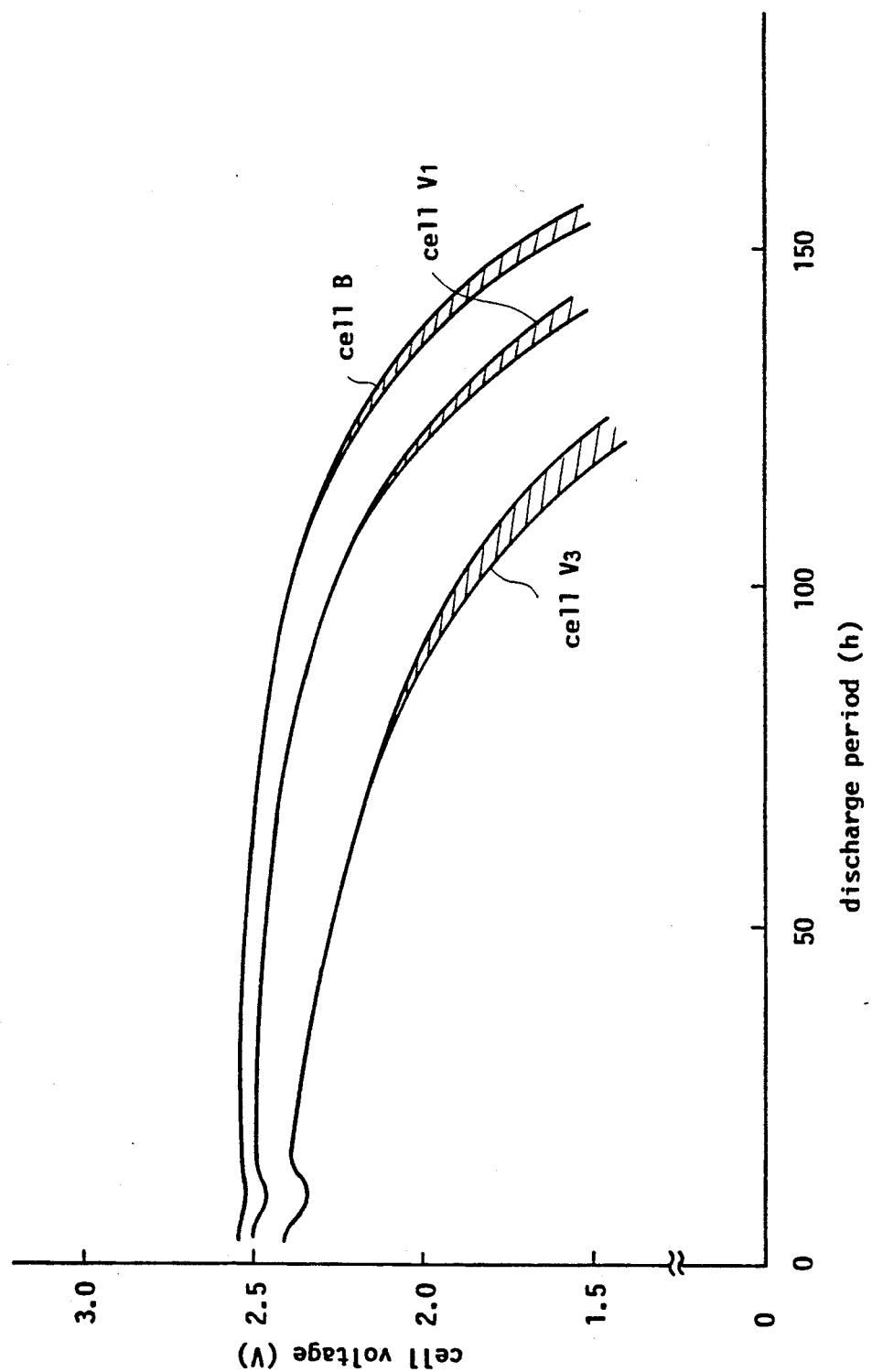
FIG. 7 is a graph showing post-storage low temperature discharge characteristics of Cells B, V1 and V3.

Initial and post-storage low temperature discharge characteristics of Cells B of the present invention and Comparative Cells V1 and V3 were checked in the same manner as in Experiment I for the first embodiment, and the results are shown in FIGS. 6 and 7.

As seen from FIGS. 6 and 7, Comparative Cell V1 is inferior in initial as well as post-storage characteristics, whereas comparative Cell V3 has superior initial characteristics but very poor post-storage characteristics. By contrast, Cell B of the present invention has proved superior in both initial and post-storage characteristics.

(Experiment II)

Figure 8:
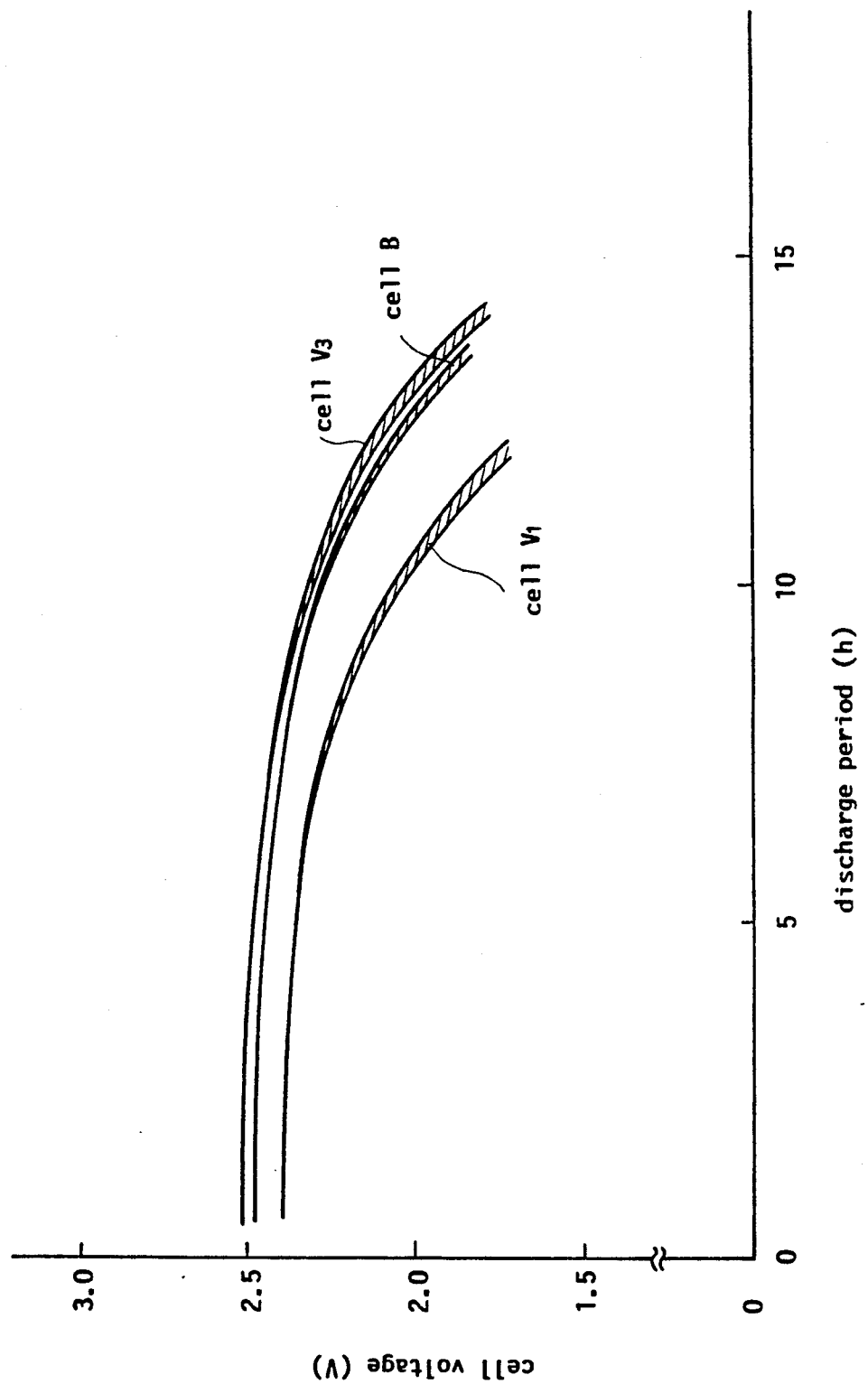
FIG. 8 is a graph showing initial high rate discharge characteristics of Cells B, V1 and V3.
Figure 9:
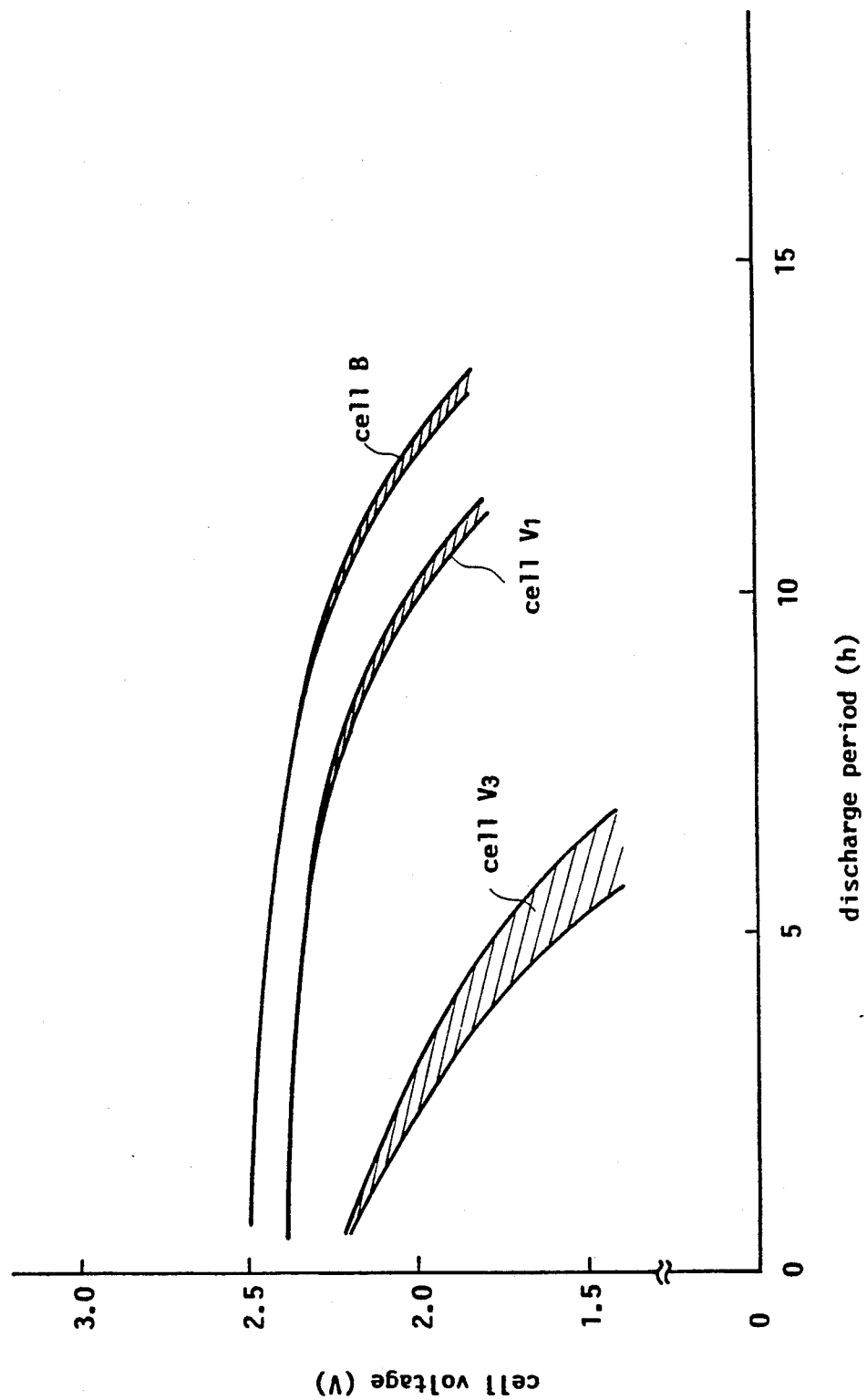
FIG. 9 is a graph showing post-storage high rate discharge characteristics of Cells B, V1 and V3.

Initial and post-storage high rate discharge characteristics of Cells B, V1 and V3 were checked in the same manner as in Experiment II for the first embodiment, and the results are shown in FIGS. 8 and 9.

As seen from FIGS. 8 and 9, Comparative Cell V1 is inferior in both initial and post-storage characteristics, whereas comparative Cell V3 has superior initial characteristics but very poor post-storage characteristics. By contrast, Cell B of the present invention has proved superior in both initial and post-storage characteristics.

Third Embodiment (Example)

A cell was manufactured in the same way as the example in the first embodiment excepting that the electrolyte used here comprised a solvent including propylene carbonate, sulfolane and tetrahydrofuran mixed in a volume ratio of 2:2:6.

The cell manufactured as above is hereinafter called Cell C.

(Comparative Example I)

A cell was manufactured in the same way as the example in the first embodiment excepting that the electrolyte here comprised a solvent including propylene carbonate and tetrahydrofuran mixed in a volume ratio of 4:6.

This cell is hereinafter called Cell W1.

(Comparative Example II)

A cell was manufactured in the same way as the example in the first embodiment excepting that the electrolyte here comprised a solvent including sulfolane and tetrahydrofuran mixed in a volume ratio of 4:6.

This cell is hereinafter called Cell W2.

Table 3 below shows particulars of the various components of Cells C, W1 and W2.

TABLE 3

|  | Cell | | |
| --- | --- | --- | --- |
|  | C | W1 | W2 |
| P. Electrode | MnO$_2$ | MnO$_2$ | MnO$_2$ |
| N. Electrode | Li | Li | Li |
| Electrolyte |  |  |  |
| Solvent | PC + SL + THF | PC + THF | SL + THF |
| Solute | LiCF$_3$SO$_3$ | LiCF$_3$SO$_3$ | LiCF$_3$SO$_3$ |
| Additive | None | None | None |

(Experiment I)

Figure 10:
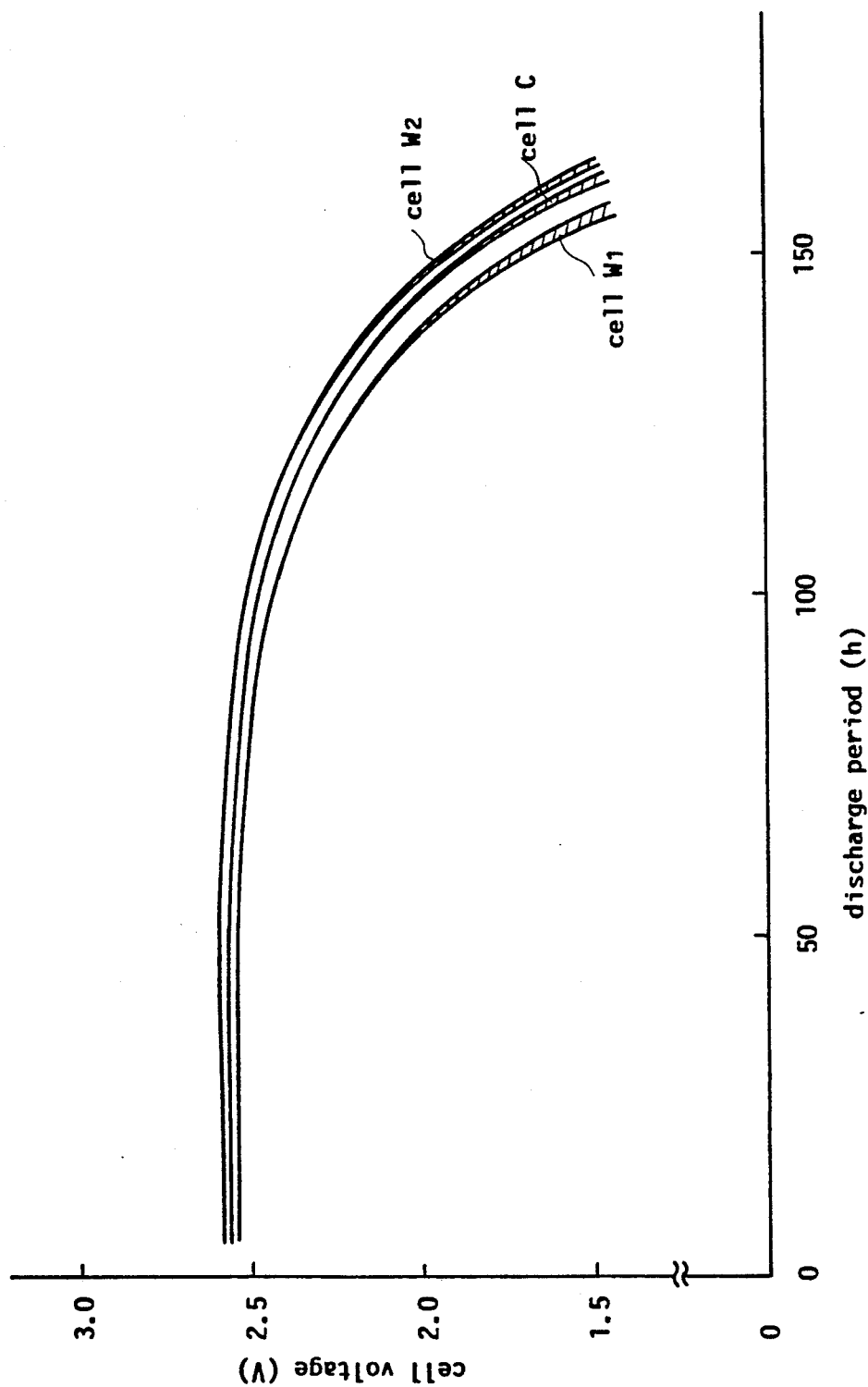
FIG. 10 is a graph showing showing initial low temperature discharge characteristics of Cell C according to the invention, Comparative Cell W1 and Comparative Cell W2.
Figure 11:
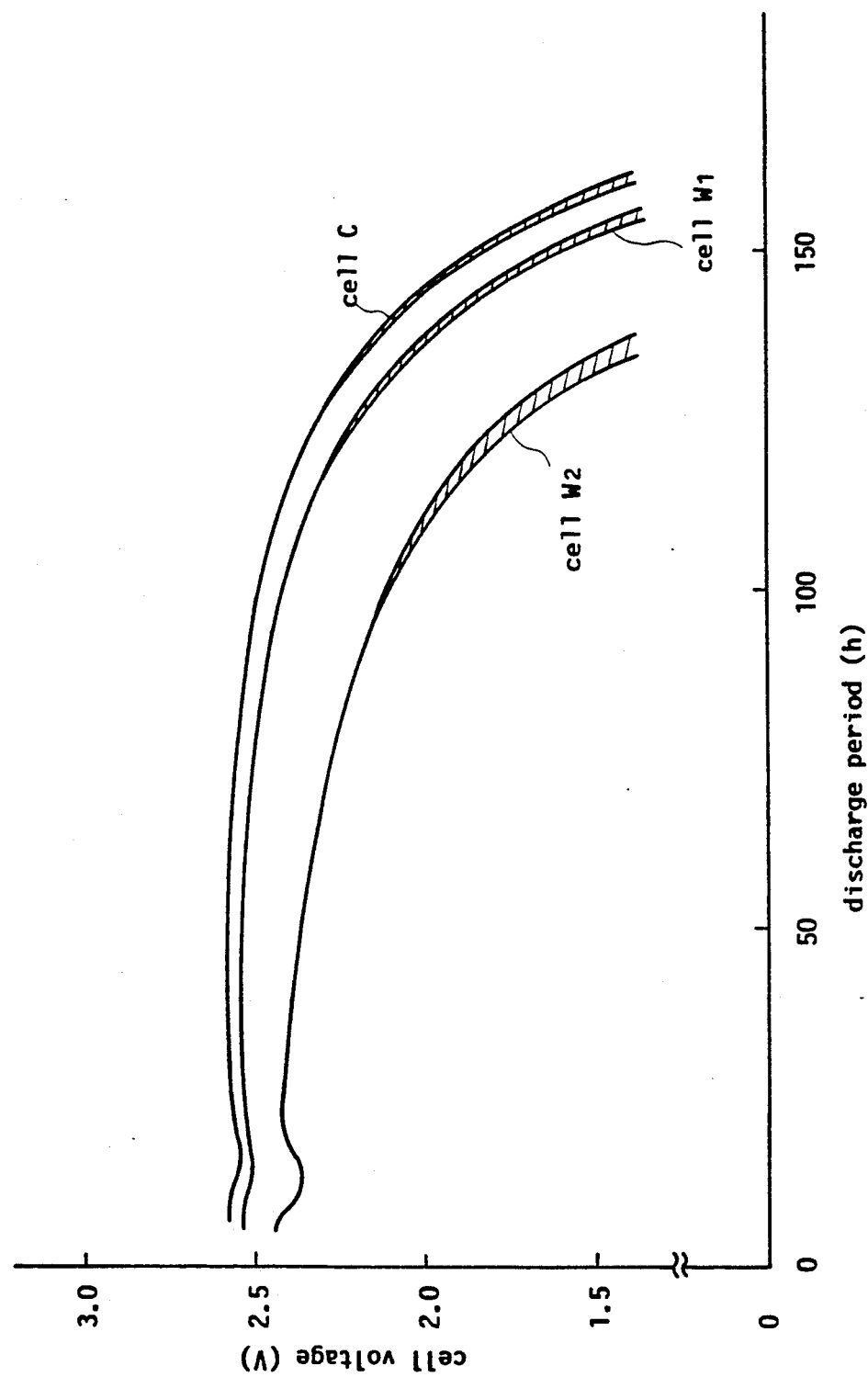
FIG. 11 is a graph showing post-storage low temperature discharge characteristics of Cells C, W1 and W2.

Initial and post-storage low temperature discharge characteristics of Cells C of the present invention and Comparative Cells W1 and W2 were checked in the same manner as in Experiment I for the first embodiment, and the results are shown in FIGS. 10 and 11.

As seen from FIGS. 10 and 11, Comparative Cell W1 is inferior in initial and post-storage characteristics, whereas comparative Cell W2 has superior initial characteristics but very poor post-storage characteristics. By contrast, Cell C of the present invention has proved superior in both initial and post-storage characteristics.

(Experiment II)

Figure 12:
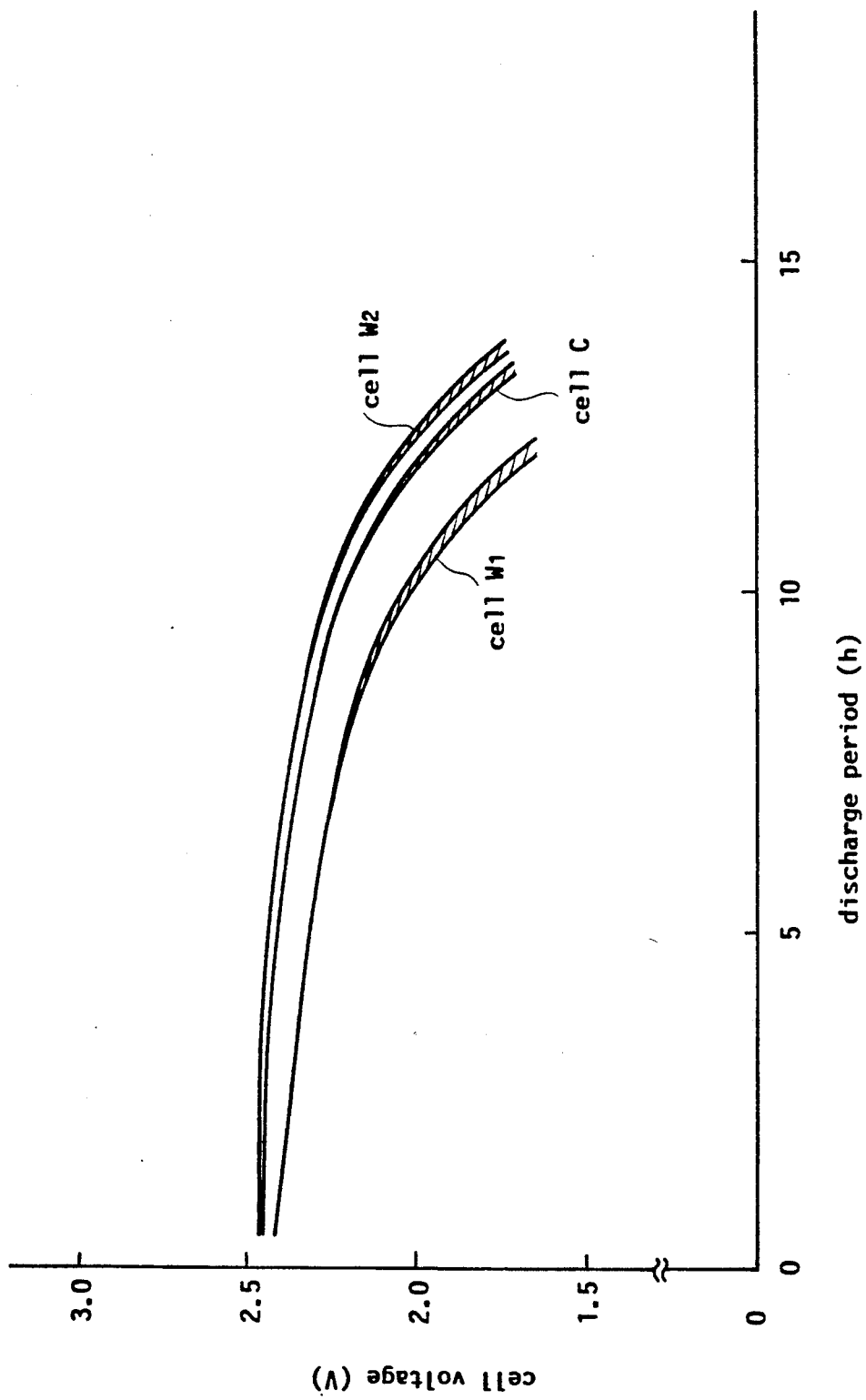
FIG. 12 is a graph showing initial high rate discharge characteristics of Cells C, W1 and W2.
Figure 13:
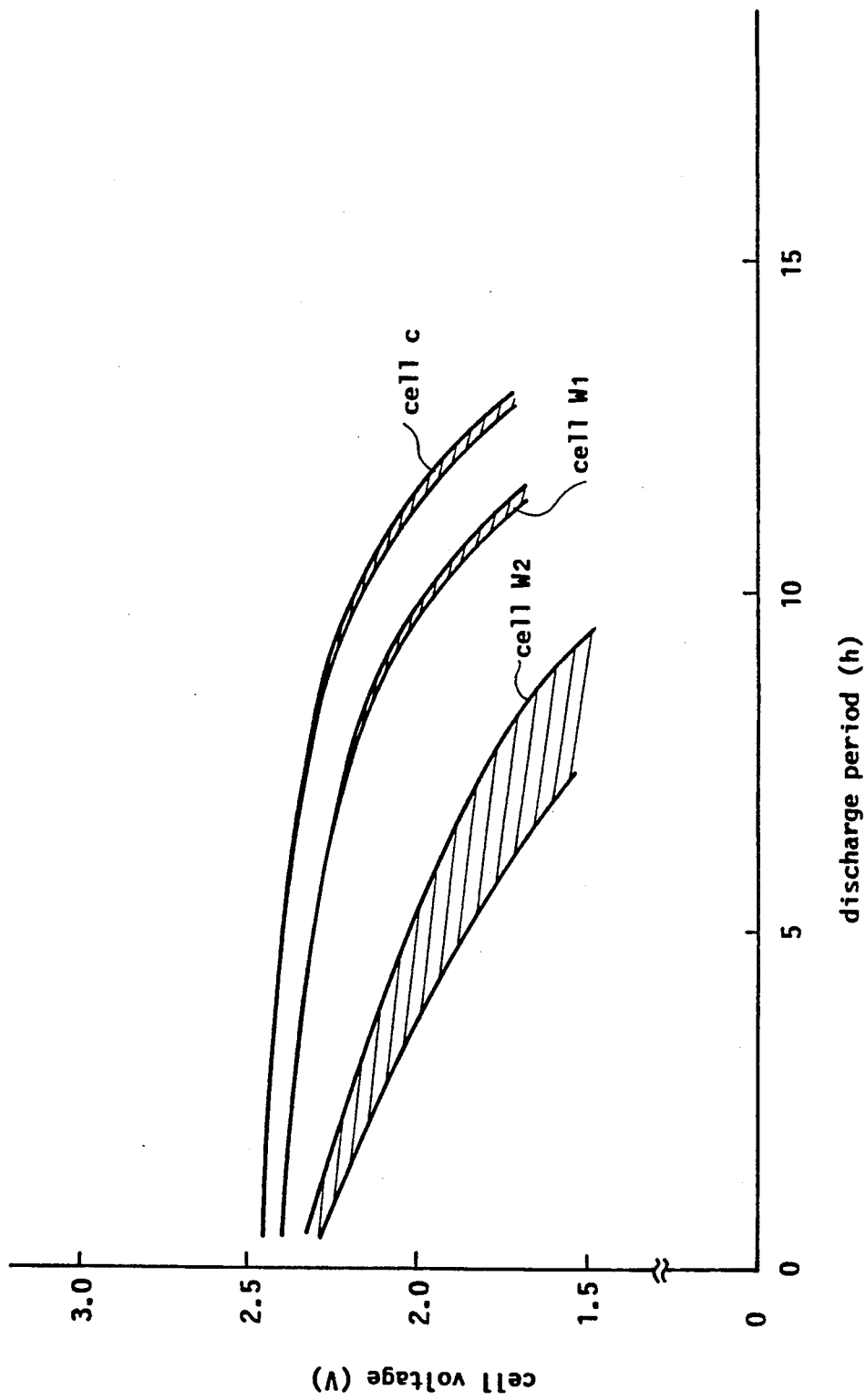
FIG. 13 is a graph showing post-storage high rate discharge characteristics of Cells C, W1 and W2.

Initial and post-storage high rate discharge characteristics of Cells C, W1 and W2 were checked in the same manner as in Experiment II for the first embodiment, and the results are shown in FIGS. 12 and 13.

As seen from FIGS. 12 and 13, Comparative Cell W1 is inferior in both initial and post-storage characteristics, whereas comparative Cell W2 has superior initial characteristics but very poor post-storage characteristics. By contrast, Cell C of the present invention has proved superior in both initial and post-storage characteristics.

Fourth Embodiment (Examples I and II)

Cells were manufactured in the same way as the example in the first embodiment excepting that the electrolytes used here comprised a solvent including ethylene carbonate, propylene carbonate and 1,2-dimethoxyethane mixed in a volume ratio of 2:2:6, and a solvent including ethylene carbonate, butylene carbonate and 1,2-dimethoxyethane mixed in a volume ratio of 2:2:6, respectively.

These cells manufactured as above are hereinafter called Cells D1 and D2.

(Comparative Example I)

A cell was manufactured in the same way as the example in the first embodiment excepting that the electrolyte here comprised a solvent including propylene carbonate and 1,2-dimethoxyethane mixed in the ratio of 4:6.

This cell is hereinafter called Cell X1.

(Experiment I)

Figure 14:
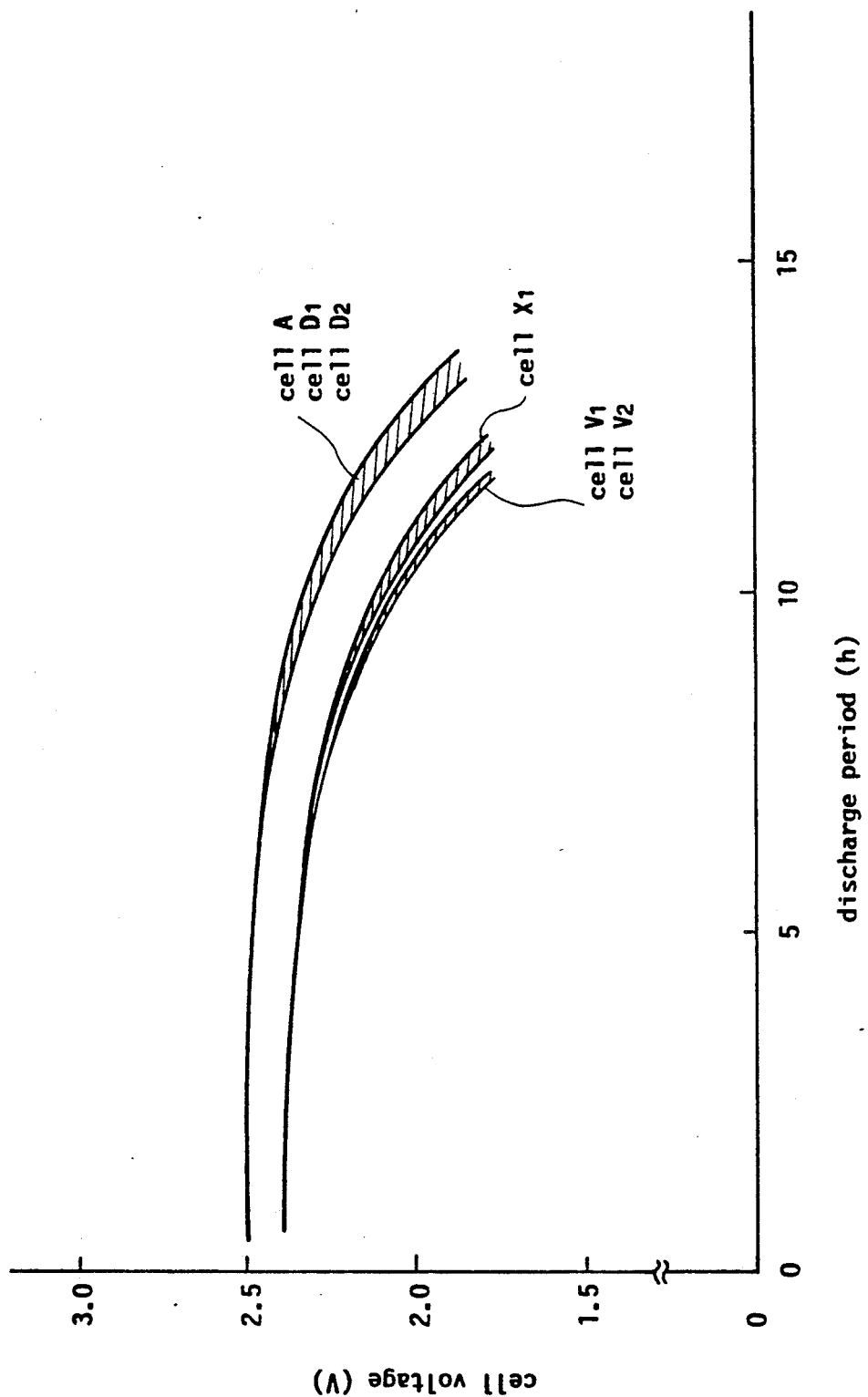
FIG. 14 is a graph showing initial high rate discharge characteristics of Cells A, D1 and D2 according to the invention and Comparative Cells V1, V2 and X1.
Figure 15:
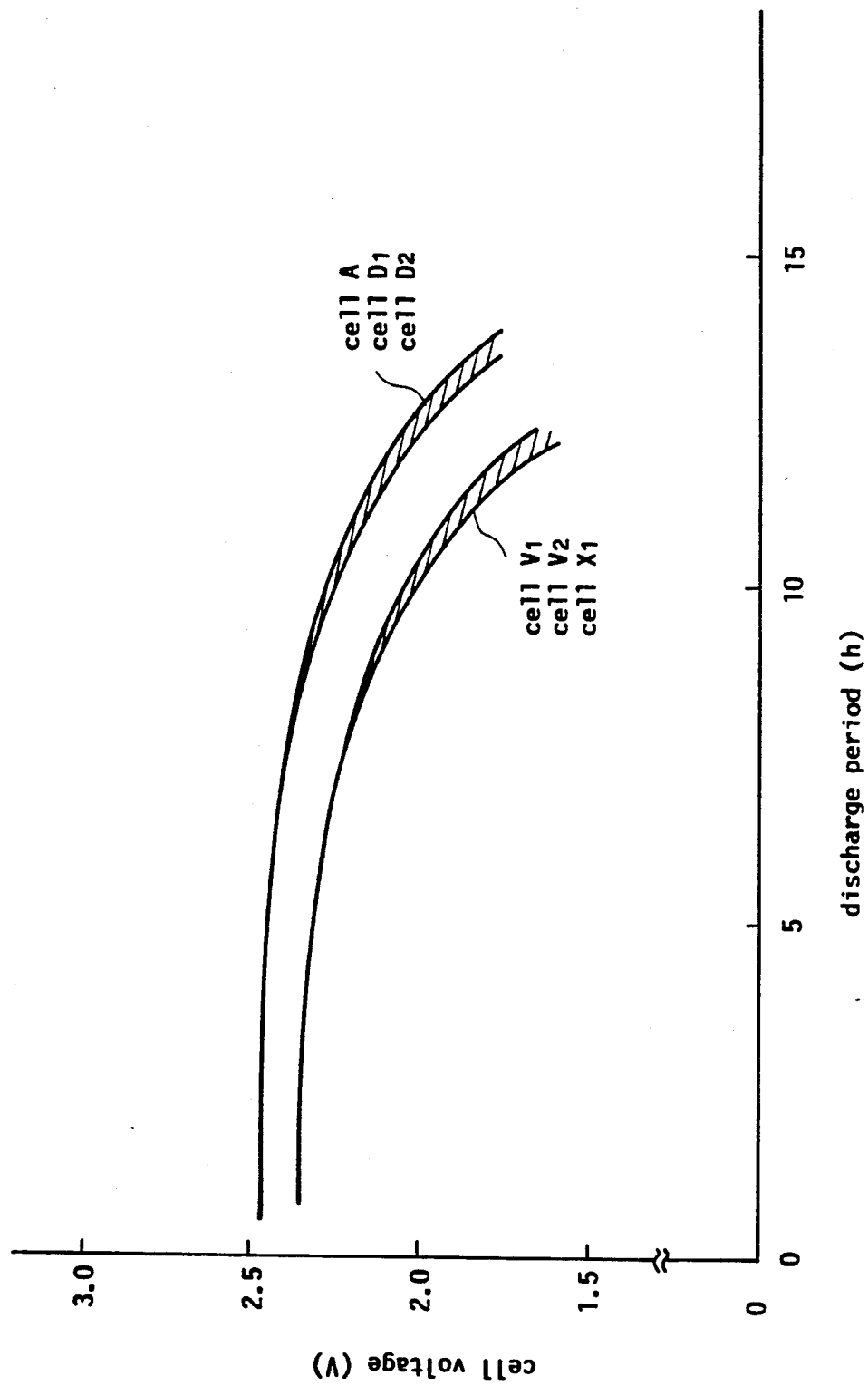
FIG. 15 is a graph showing post-storage high rate discharge characteristics of Cells A, D1, D2, V1, V2 and X1.

Initial and post-storage high rate discharge characteristics of Cells D1, D2 and A of the present invention and Comparative Cells X1, V1 and V2 were checked in the same manner as in Experiment II for the first embodiment, and the results are shown in FIGS. 14 and 15.

As seen from FIGS. 14 and 15, Cells D1, D2 and A are superior to Comparative Cells X1, V1 and V2 in both initial and post-storage high rate discharge characteristics. Further, Cells D1, D2 and A of the present invention are superior also to Cells B and C.

This is due to the fact that, in the case of electrolyte including two cyclic carbonates, the conductivity and viscosity of the electrolyte can be set to levels well suited for high rate discharge characteristics.

(Experiment II)

Figure 16:
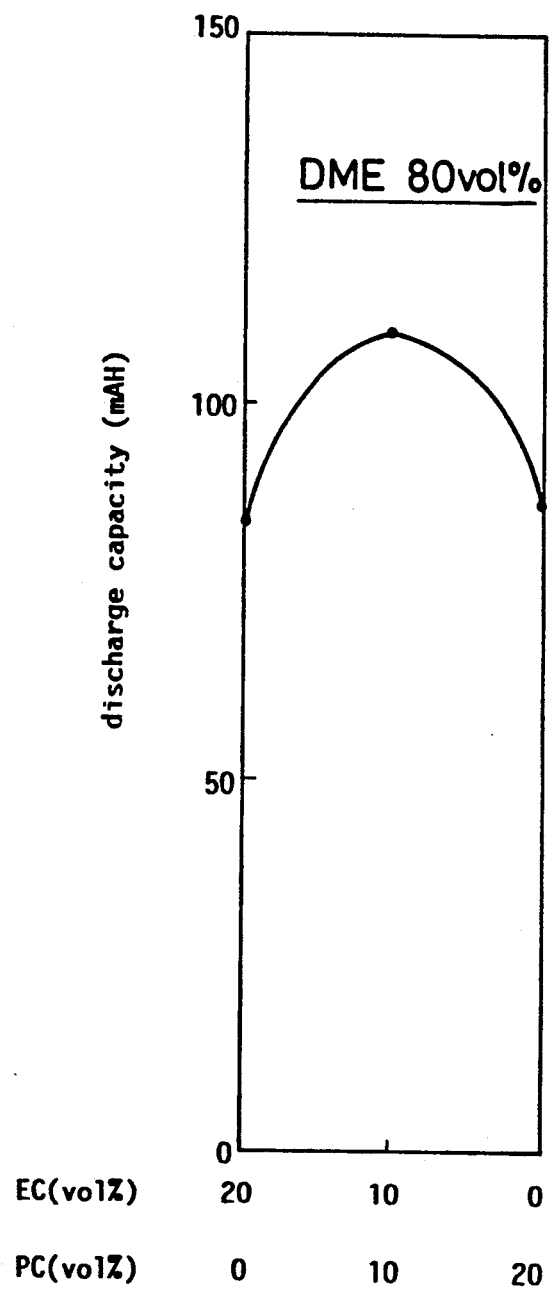
FIGS. 16 through 18 are graphs showing relationship between mixing ratio and discharge capacity in solvent mixtures of ethylene carbonate, propylene carbonate and 1,2-dimethoxyethane.
Figure 17:
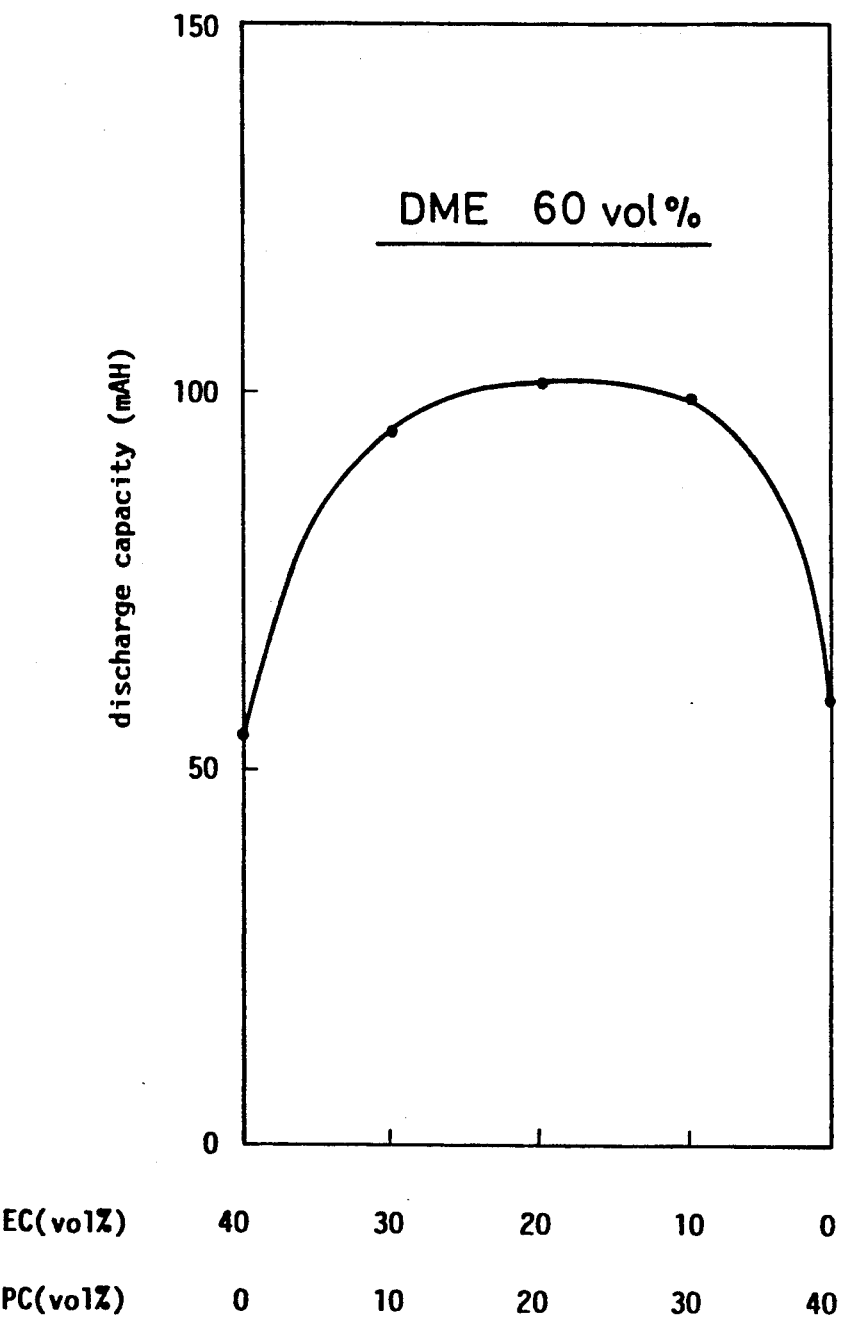
Figure 18:
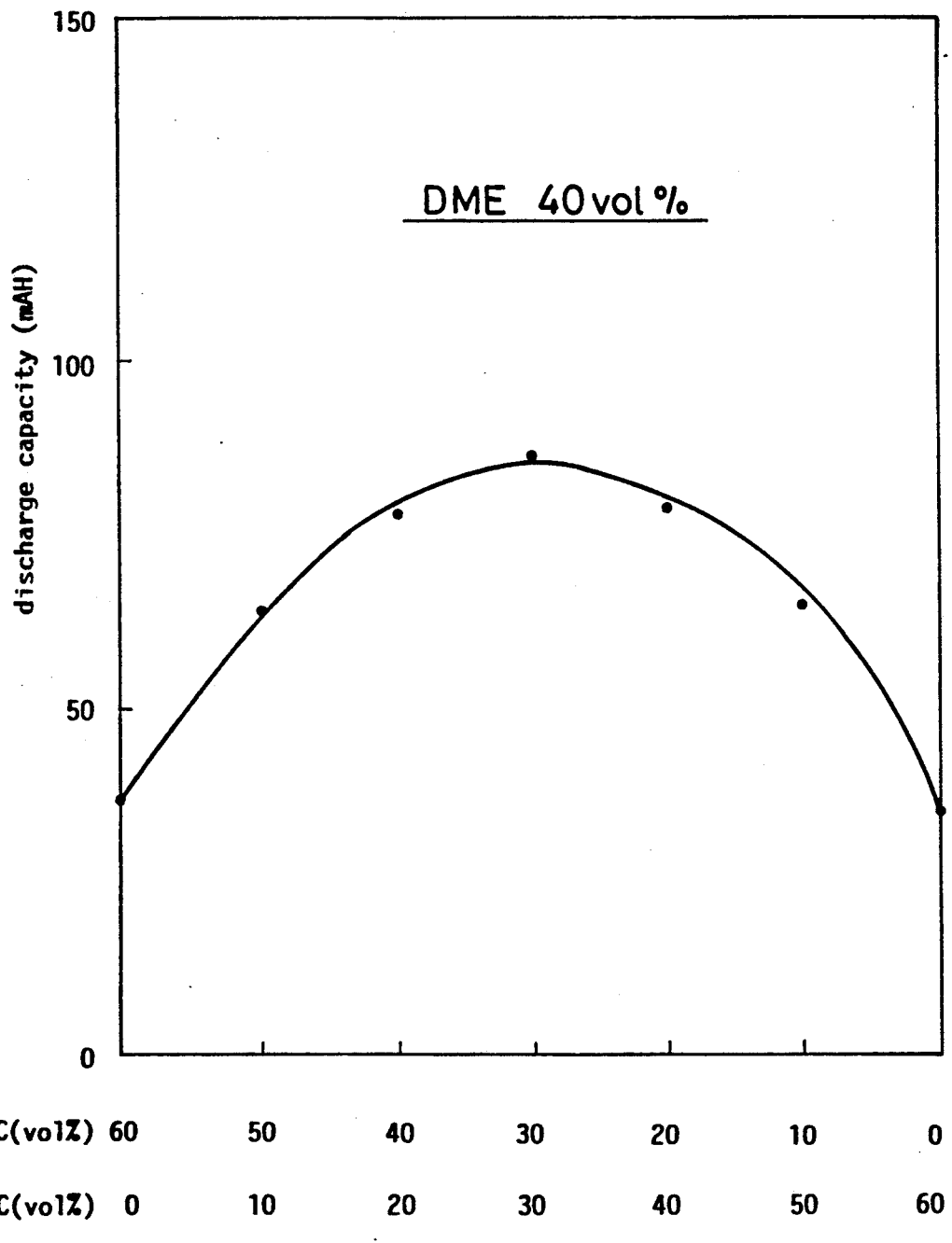

The solvent mixtures of ethylene carbonate, propylene carbonate and 1,2-dimethoxyethane were checked with respect to the relationship between the mixing ratio and discharge capacity, and the results are shown in FIGS. 16 through 18. The cells were discharged at a temperature of 25° C. and with a resistance of 300Ω.

As seen from FIGS. 16 through 18, it is desirable that the cyclic carbonates are mixed in the solvent in 5-30 volume %.

Fifth Embodiment (Example I)

A cell was manufactured in the same way as the example in the first embodiment excepting that the electrolyte used here comprised a solvent including propylene carbonate and 1,2-dimethoxyethane mixed in the ratio of 4:6, and that the negative electrode 2 comprised lithium-aluminum alloy.

The negative electrode 2 was prepared by punching a piece having a selected size out of lithium-aluminum alloy including 2% by weight of aluminum.

The cell manufactured as above is hereinafter called Cell E1.

(Example II)

A cell was manufactured in the same way as Example I above excepting that the negative electrode 2 comprised lithium-indium alloy including 2% by weight of indium.

This cell is hereinafter called Cell E2.

(Example III)

A cell was manufactured in the same way as Example I above excepting that the negative electrode 2 comprised lithium-tin alloy including 2% by weight of tin.

This cell is hereinafter called Cell E3.

(Comparative Example)

A cell was manufactured, for comparative purposes, in the same way as Example I above excepting that the negative electrode 2 comprised lithium alone.

This cell is hereinafter called Cell Y.

Table 4 below shows particulars of the various components of Cells E1-E3 and Y.

TABLE 4

| | Cell | | | |
|---|---|---|---|---|
| | E1 | E2 | E3 | Y |
| P. Electrode | $MnO_2$ | $MnO_2$ | $MnO_2$ | $MnO_2$ |
| N. Electrode | Li—Al | Li—In | Li—Sn | Li |
| Electrolyte | | | | |
| Solvent | PC + DME | PC + DME | PC + DME | PC + DME |
| Solute | $LiCF_3SO_3$ | $LiCF_3SO_3$ | $LiCF_3SO_3$ | $LiCF_3SO_3$ |
| Additive | None | None | None | None |

(Experiment I)

Figure 19:
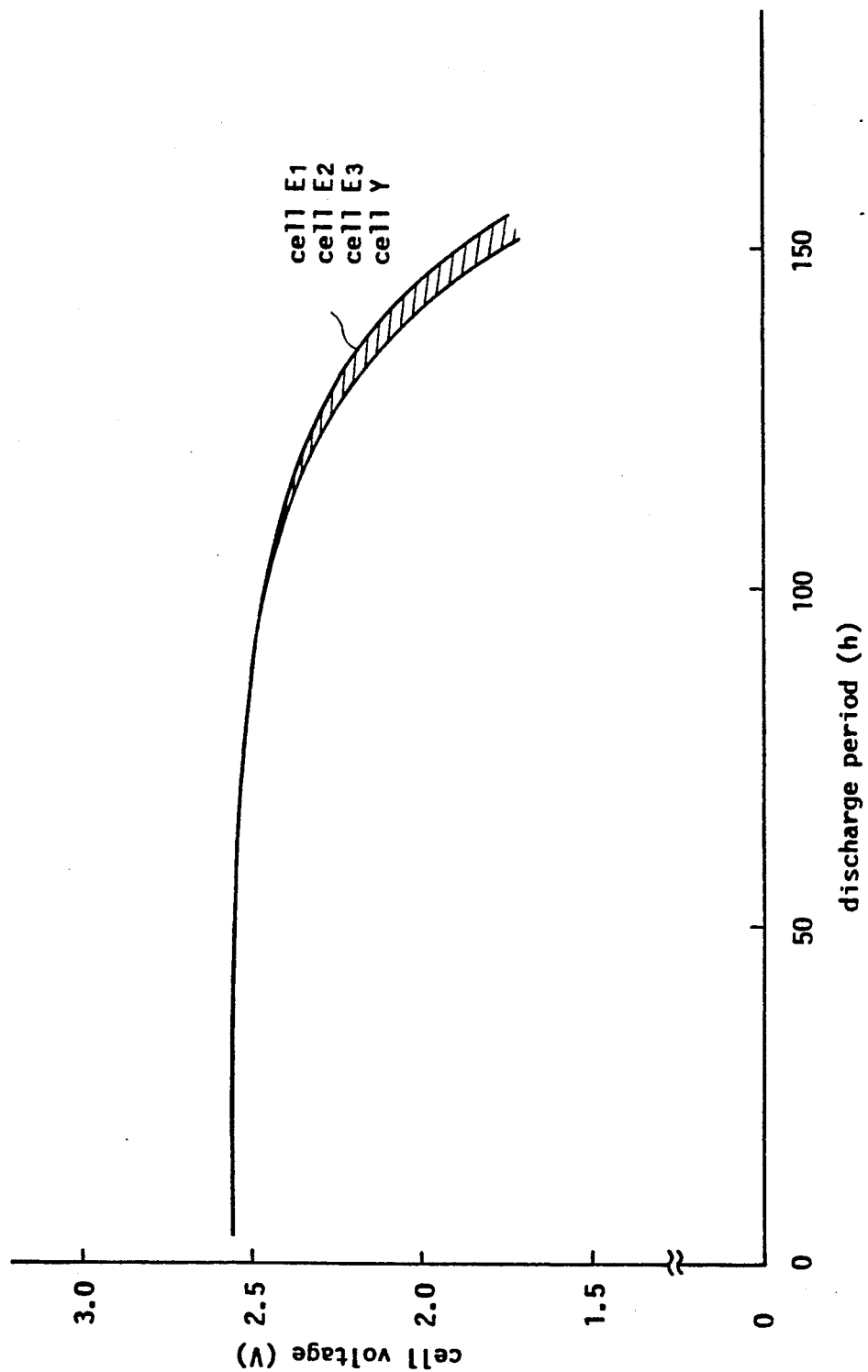
FIG. 19 is a graph showing initial low temperature discharge characteristics of Cells E1–E3 according to the invention and Comparative Cell Y.
Figure 20:
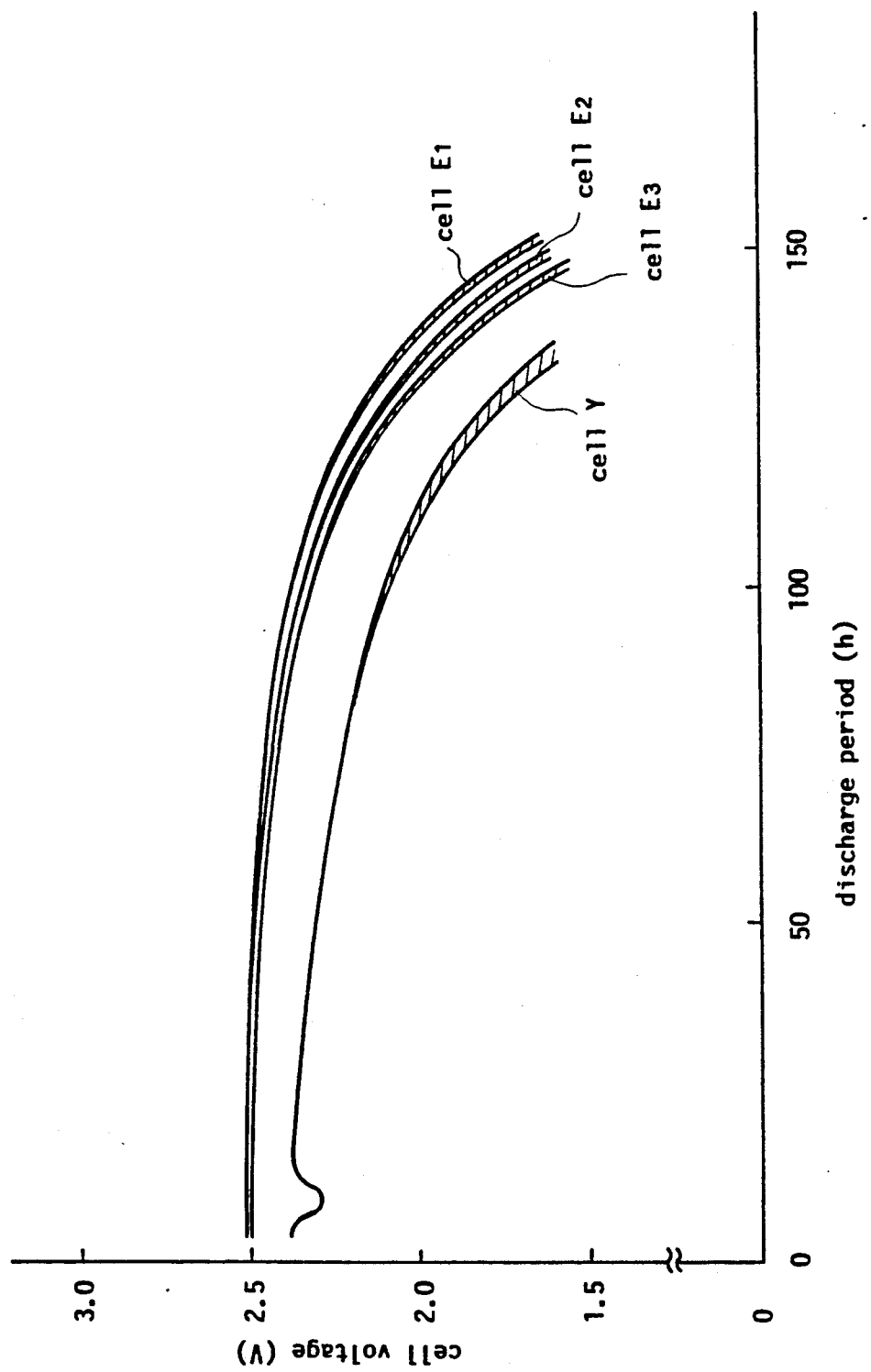
FIG. 20 is a graph showing post-storage low temperature discharge characteristics of Cells E1–E3 and Y.

Initial and post-storage low temperature discharge characteristics of Cells E1-E3 of the present invention and Comparative Cell Y were checked in the same manner as in Experiment I for the first embodiment, and the results are shown in FIGS. 19 and 20.

As seen from FIGS. 19 and 20, Cells E1-E3 and Y are similar in initial low temperature discharge characteristics, but Cells E1-E3 are superior to Cell Y in post-storage low temperature discharge characteristics, Cell E1 being the best of all.

(Experiment II)

The internal resistance of these cells were measured before and after storage at high temperature. The results are shown in Table 5 below.

TABLE 5

| | Internal Resistance | |
|---|---|---|
| | Before Storage | After Storage |
| Cell E1 | 10–12 Ω | 13–16 Ω |
| Cell E2 | 10–12 Ω | 14–16 Ω |
| Cell E3 | 10–12 Ω | 14–16 Ω |
| Cell Y | 10–12 Ω | 25–35 Ω |

It will be seen from Table 5 that the internal resistance of Cells E1-E3 increased only slightly in contrast with that of Cell Y which shows a substantial increase after storage.

(Experiment III)

Figure 21:
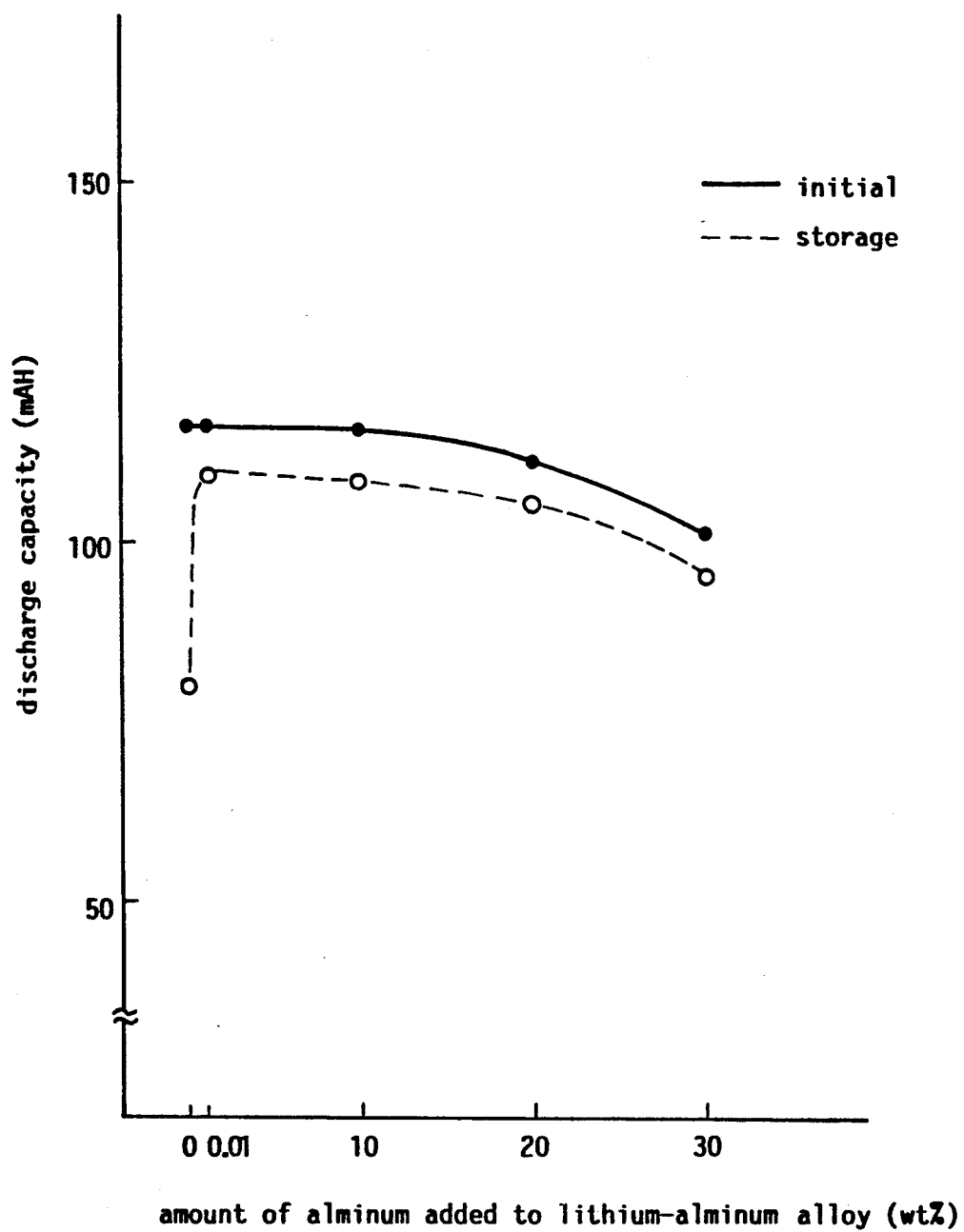
FIG. 21 is a graph showing relationship between discharge capacity and the amount of aluminum added to lithium-aluminum alloy.

The relationship between the amount of aluminum in the lithium-aluminum alloy and the cell capacity was checked immediately after assembly of the cells and after storing the cells at 60° C. for three months, and the results are shown in FIG. 21. The cells were discharged at a temperature of −20° C. and with a load of 3KΩ.

As seen from FIG. 21, the cells have a discharge capacity exceeding 100 mAH after storage where aluminum is added in 0.01–20% by weight. It is thus desirable that aluminum is added in 0.01–20% by weight.

This means that aluminum produces little effect if added in less than 0.01% by weight, and lowers the cell capacity if added in an amount exceeding 20% by weight.

Figure 22:
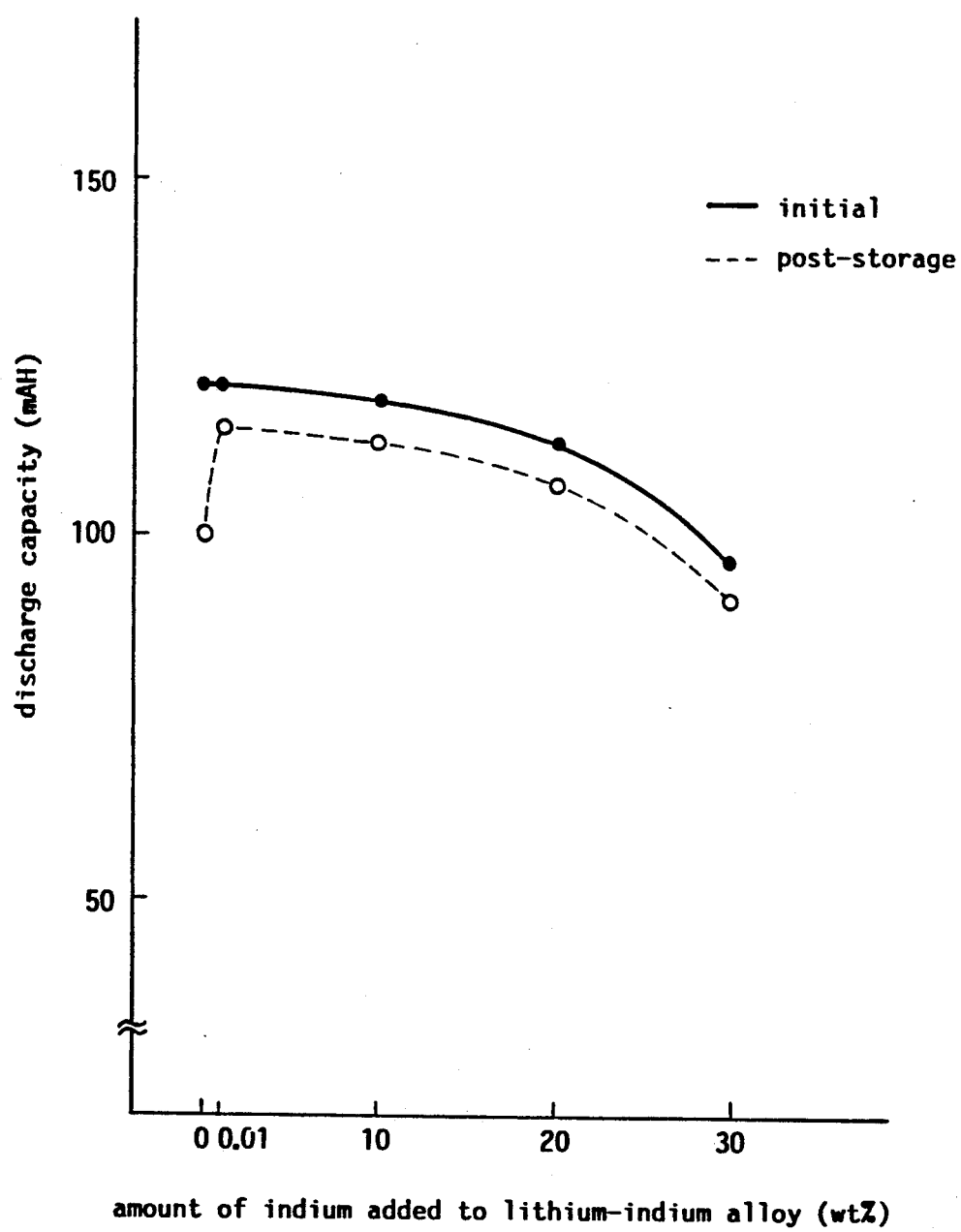
FIG. 22 is a graph showing relationship between discharge capacity and the amount of indium added to indium-aluminum alloy.

The relationship between the amount of indium in the lithium-indium alloy and the cell capacity was checked under the same conditions, and the results are shown in FIG. 22.

It will be seen that, here again, indium should preferably be added in 0.01–20% by weight.

In the fifth embodiment, the negative electrode comprises lithium-aluminum alloy, lithium-indium alloy or lithium-tin alloy. The material used for the negative electrode is not limited to these alloys. Similar effects may be produced where the negative electrode comprises lithium-lead alloy, lithium-bismuth alloy, lithium-gallium alloy, lithium-strontium alloy, lithium-silicon alloy, lithium-zinc alloy, lithium-cadmium alloy, lithium-calcium alloy or lithium-barium alloy.

Sixth Embodiment (Example I)

A cell was manufactured in the same way as the example in the first embodiment excepting that the electrolyte used here comprised a solvent including propylene carbonate and 1,2-dimethoxyethane mixed in a volume ratio of 4:6, with lithium nitrate ($LiNO_3$) dissolved in the electrolyte in 1 g/lit.

The cell manufactured as above is hereinafter called Cell F1.

(Example II)

A cell was manufactured in the same way as Example I above excepting that triethyl phosphate was added in 0.1 g/lit. to the electrolyte.

This cell is hereinafter called Cell F2.

(Example III)

A cell was manufactured in the same way as Example I above excepting that tri-n-butyl phosphate was added in 0.1 g/lit. to the electrolyte.

This cell is hereinafter called Cell F3.

(Comparative Example)

A cell was manufactured in the same way as Example I above excepting that no additive is included in the electrolyte.

This cell is hereinafter called Cell Z.

Table 6 below shows particulars of the various components of Cells F1–F3 and Z.

TABLE 6

|  | Cell | | | |
| --- | --- | --- | --- | --- |
|  | F1 | F2 | F3 | Z |
| P. Electrode | $MnO_2$ | $MnO_2$ | $MnO_2$ | $MnO_2$ |
| N. Electrode | Li | Li | Li | Li |
| Electrolyte |  |  |  |  |
| Solvent | PC + DME | PC + DME | PC + DME | PC + DME |
| Solute | $LiCF_3SO_3$ | $LiCF_3SO_3$ | $LICF_3SO_3$ | $LiCF_3SO_3$ |
| Additive | $LiNO_3$ | triethyl phosphate | tri-n-butyl phosphate | None |

(Experiment I)

Figure 23:
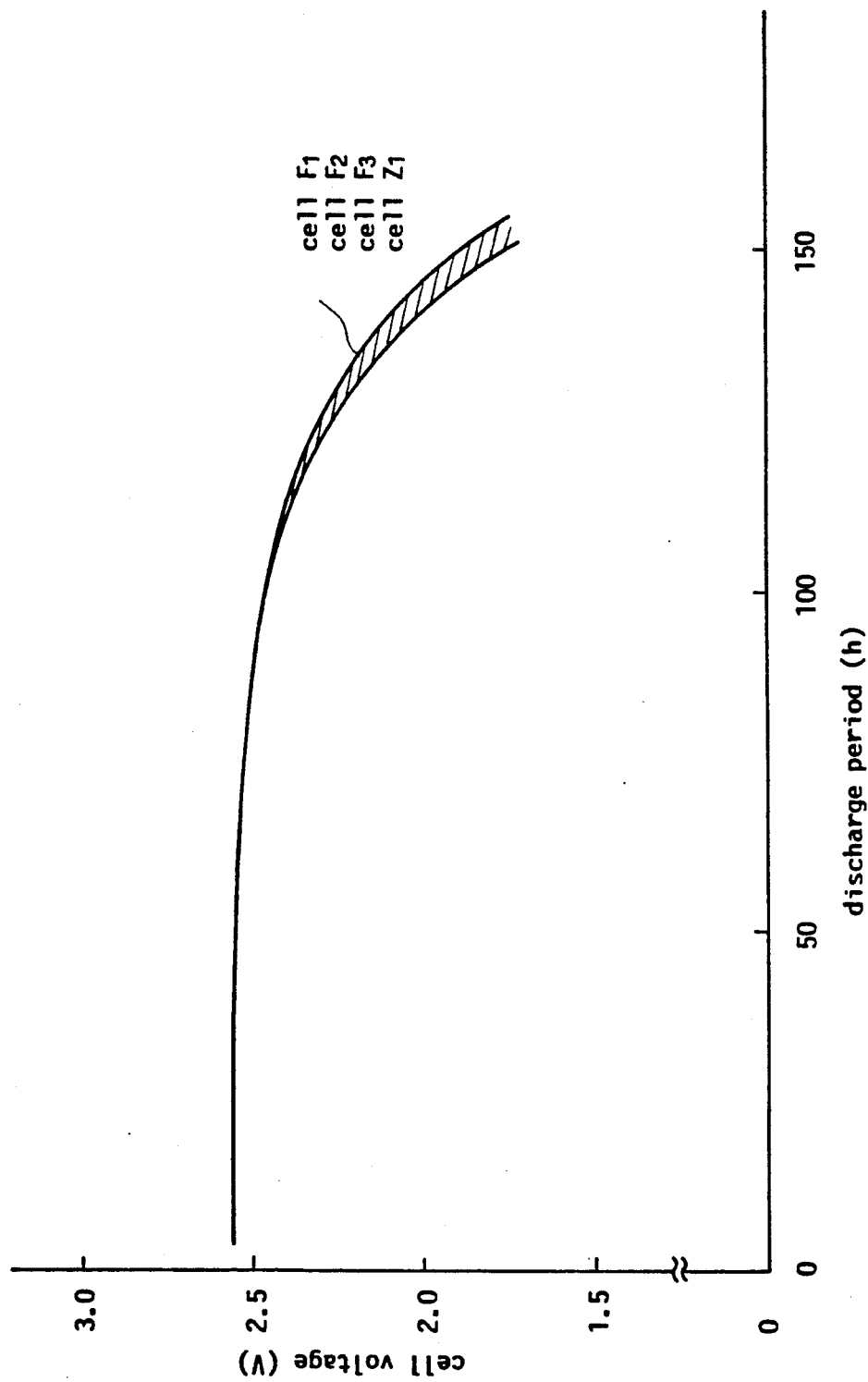
FIG. 23 is a graph showing initial low temperature discharge characteristics of Cells F1–F3 according to the invention and Comparative Cell Z.
Figure 24:
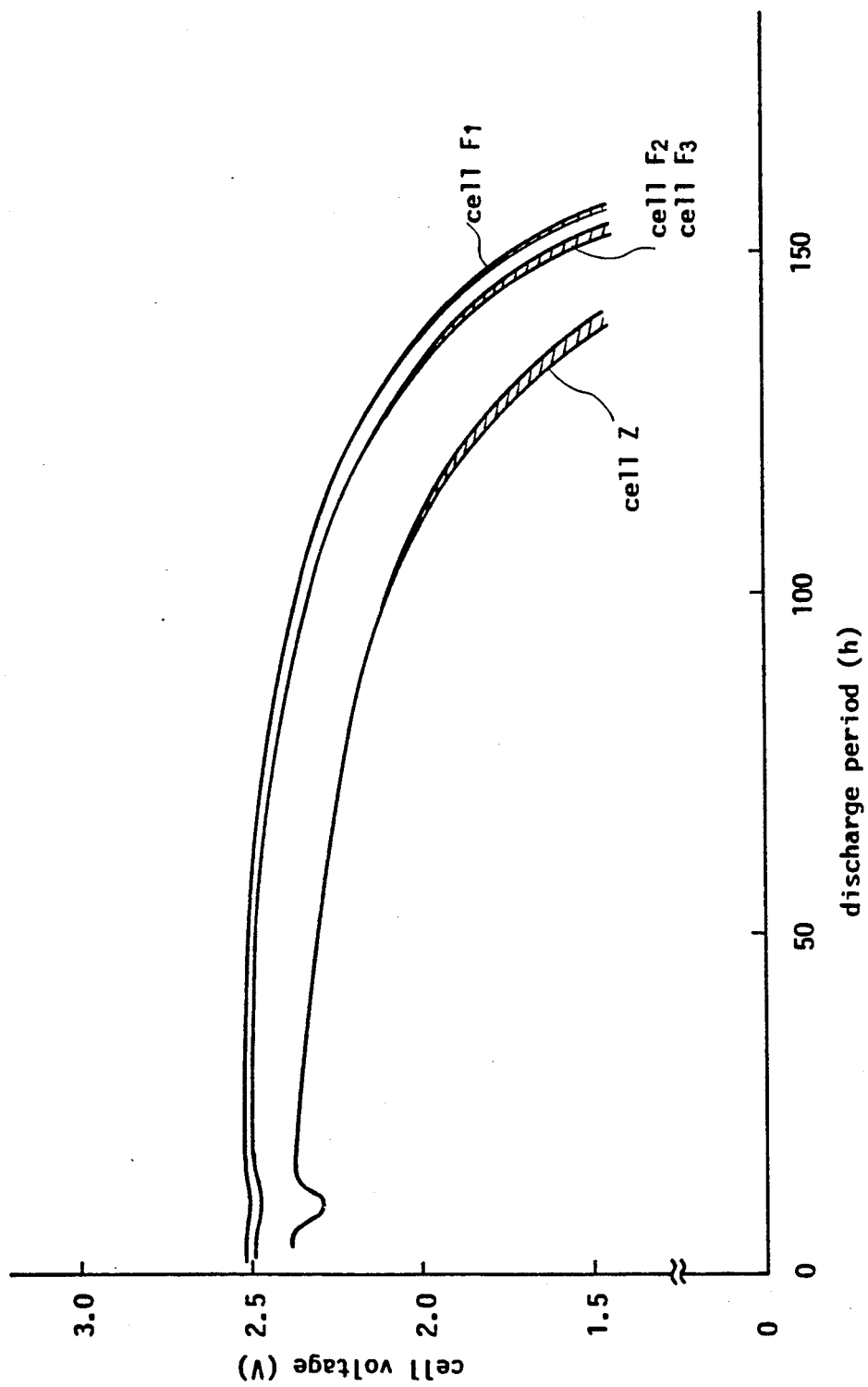
FIG. 24 is a graph showing post-storage low temperature discharge characteristics of Cells F1–F3 and Z.

Initial and post-storage low temperature discharge characteristics of Cells F1–F3 of the present invention and Comparative Cell Z were checked in the same manner as in Experiment I for the first embodiment, and the results are shown in FIGS. 23 and 24.

As seen from FIGS. 23 and 24, Cells F1–F3 and Z are similar in initial low temperature discharge characteristics, but Cells F1–F3 are superior to Cell Z in post-storage low temperature discharge characteristics, Cell F1 being the best of all.

(Experiment II)

The internal impedance of these cells were measured with 1 KHz frequency after storage at high temperature. The results are shown in Table 7 below.

TABLE 7

|  | Internal Resistance | |
| --- | --- | --- |
|  | Before Storage | After Storage |
| Cell F1 | 10–12 Ω | 13–15 Ω |
| Cell F2 | 10–12 Ω | 14–15 Ω |
| Cell F3 | 10–12 Ω | 14–15 Ω |
| Cell Z | 10–12 Ω | 25–35 Ω |

It will be seen from Table 7 that the internal impedance of Cells F1–F3 increased only slightly in contrast with that of Cell Z which showed a substantial increase after storage.

The cells were disassembled after the storage. It was found that Cell Z had the lithium surface of the negative electrode discolored black but Cells F1–F3 showed no such phenomenon.

Further, the cell cans were observed through a metallurgical microscope after the storage. Cell Z showed considerable pitting corrosion of the can but Cells F1–F3 were free from corrosion.

These results point to the fact that, in the case of Comparative Cell Z, re-deposition took place as a result of the corrosion of the cell can during the storage, thereby lowering the post-storage low temperature discharge characteristics. In the case of Cells F1–F3 of the present invention having the electrolyte added with lithium nitrate, triethyl phosphate or tri-n-butyl phosphate, it is believed that the corrosion of the can is suppressed thereby to prevent lowering of the post-storage low temperature discharge characteristics.

Seventh Embodiment

A cell was manufactured in the same way as Example I in the sixth embodiment excepting that the negative electrode comprised lithium-aluminum alloy (Al: 2% by weight).

This cell is hereinafter called Cell G.

(Experiment I)

Figure 25:
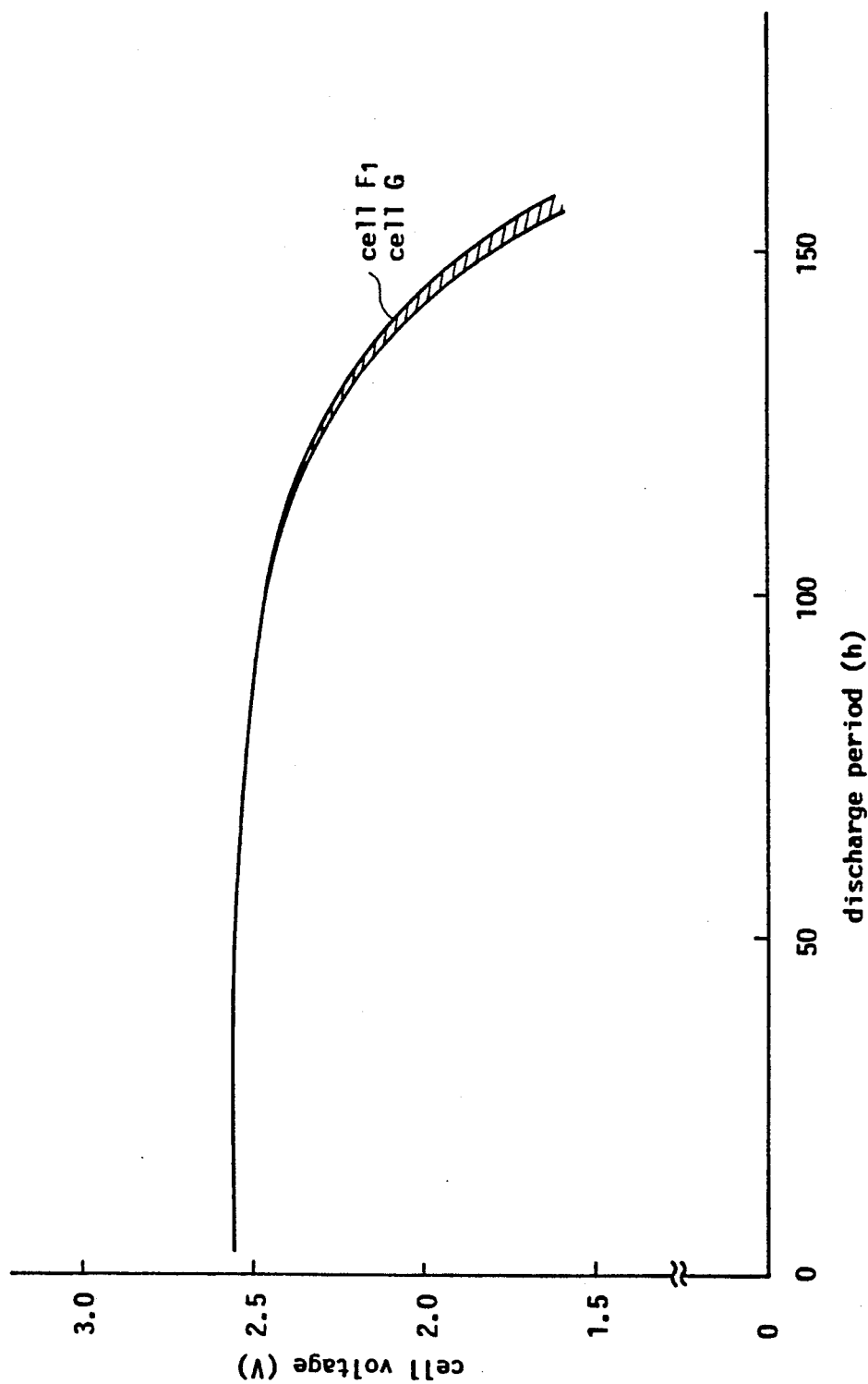
FIG. 25 is a graph showing initial low temperature discharge characteristics of Cells F1 and G according to the invention.
Figure 26:
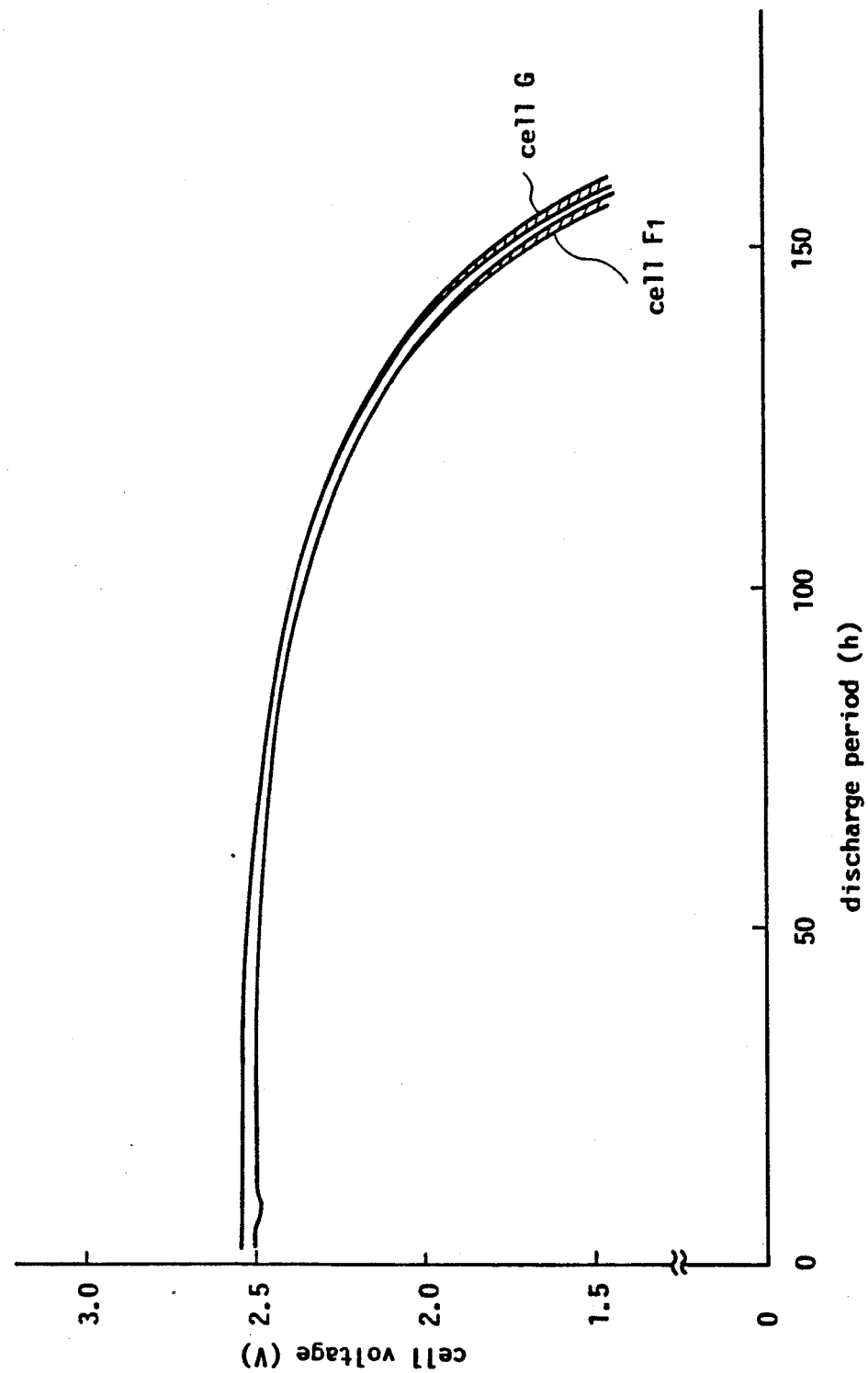
FIG. 26 is a graph showing post-storage low temperature discharge characteristics of Cells F1 and G.

Initial and post-storage low temperature discharge characteristics of Cells G and F1 of the present invention were checked in the same manner as in Experiment I for the first embodiment, and the results are shown in FIGS. 25 and 26.

As seen from FIGS. 25 and 26, both cells are similar in initial low temperature discharge characteristics, but Cell G has proved an improvement upon Cell F1 in post-storage characteristics.

Eighth Embodiment

A cell was manufactured in the same way as Example I in the sixth embodiment excepting that the negative electrode 2 comprised lithium-aluminum alloy (Al: 2% by weight), and the electrolyte comprised an organic solvent mixture of ethylene carbonate, butylene carbonate and 1,2-dimethoxyethane.

The cell manufactured as above is hereinafter called Cell H.

(Experiment)

Figure 27:
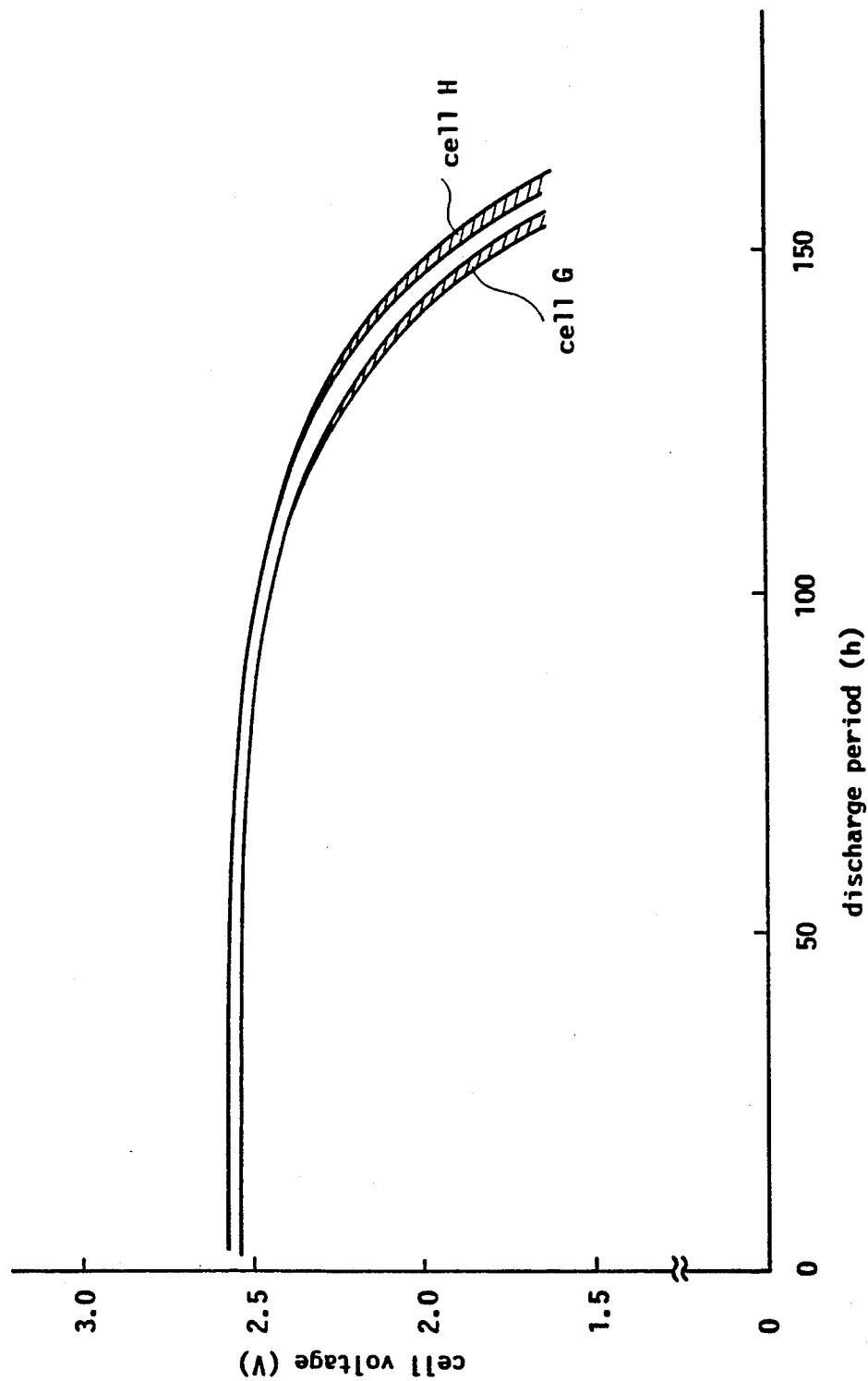
FIG. 27 is a graph showing initial low temperature discharge characteristics of Cells G and H according to the invention.
Figure 28:
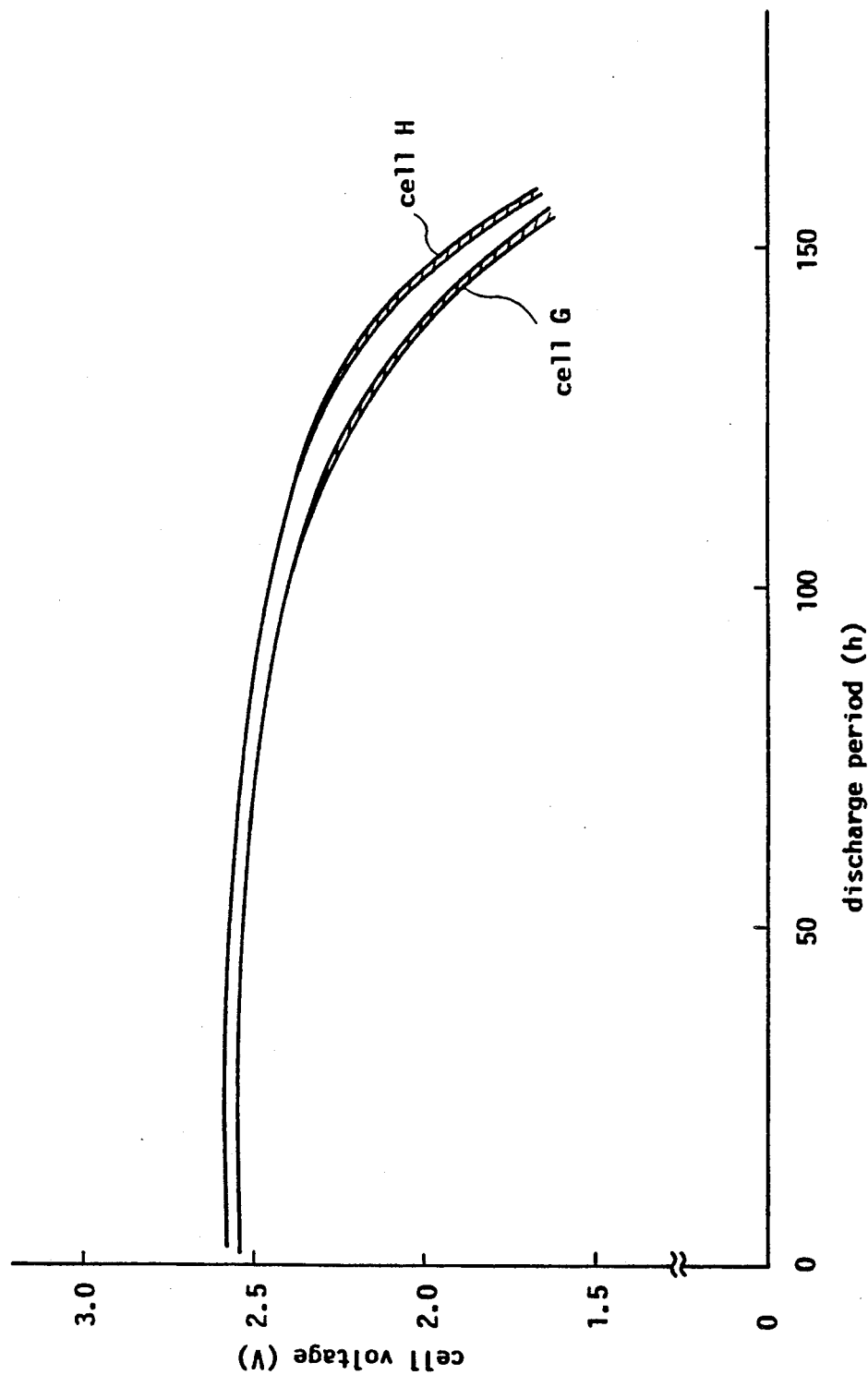
FIG. 28 is a graph showing post-storage low temperature discharge characteristics of Cells G and H.

Initial and post-storage low temperature discharge characteristics of Cells H and G of the present invention were checked in the same manner as in Experiment I for the first embodiment, and the results are shown in FIGS. 27 and 28.

As seen from FIGS. 27 and 28, Cell H is an improvement upon Cell G in both initial and post-storage low temperature discharge characteristics.

In the sixth to eighth embodiments, lithium nitrate, triethyl phosphate and tri-n-butyl phosphate are used as additives. The additives are not limited to these substances, but similar effects are produced by using other nitrogen compounds (NNN'N'-tetramethyl ethylenediamine, 1,2-diphenyl ethylenediamine, diethyldithiocarbamin), and other phosphoric compounds (triethyle phosphate, ammonium hypophosphite, urea orthophosphite).

Ninth Embodiment

A cell was manufactured in the same way as the example in the first embodiment excepting that the electrolyte comprised a solute consisting of lithium trifluoromethanesulfonate ($LiCF_3SO_3$) heated, dried and dehydrated at 120° C. in a vacuum (not exceeding 5 mmHg) for 12 hours, and a solvent mixture of propylene carbonate and 1,2-dimethoxyethane. Lithium trifluoromethanesulfonate was dissolved in 1 mole/lit. in the solvent mixture.

This cell is hereinafter called Cell I1.

(Comparative Examples I-III)

Three cells were manufactured, for comparison purposes, in the same way as Example I in the seventh embodiment excepting that the electrolyte comprised solutes consisting of lithium trifluoromethanesulfonate dried at 25° C. in a vacuum for 12 hours, lithium trifluoromethanesulfonate dried at 50° C. in a vacuum for 12 hours, and lithium trifluoromethanesulfonate dried at 200° C. in a vacuum for 12 hours, respectively.

These cells are hereinafter called Cells U1, U2 and U3.

(Experiment I)

Figure 29:
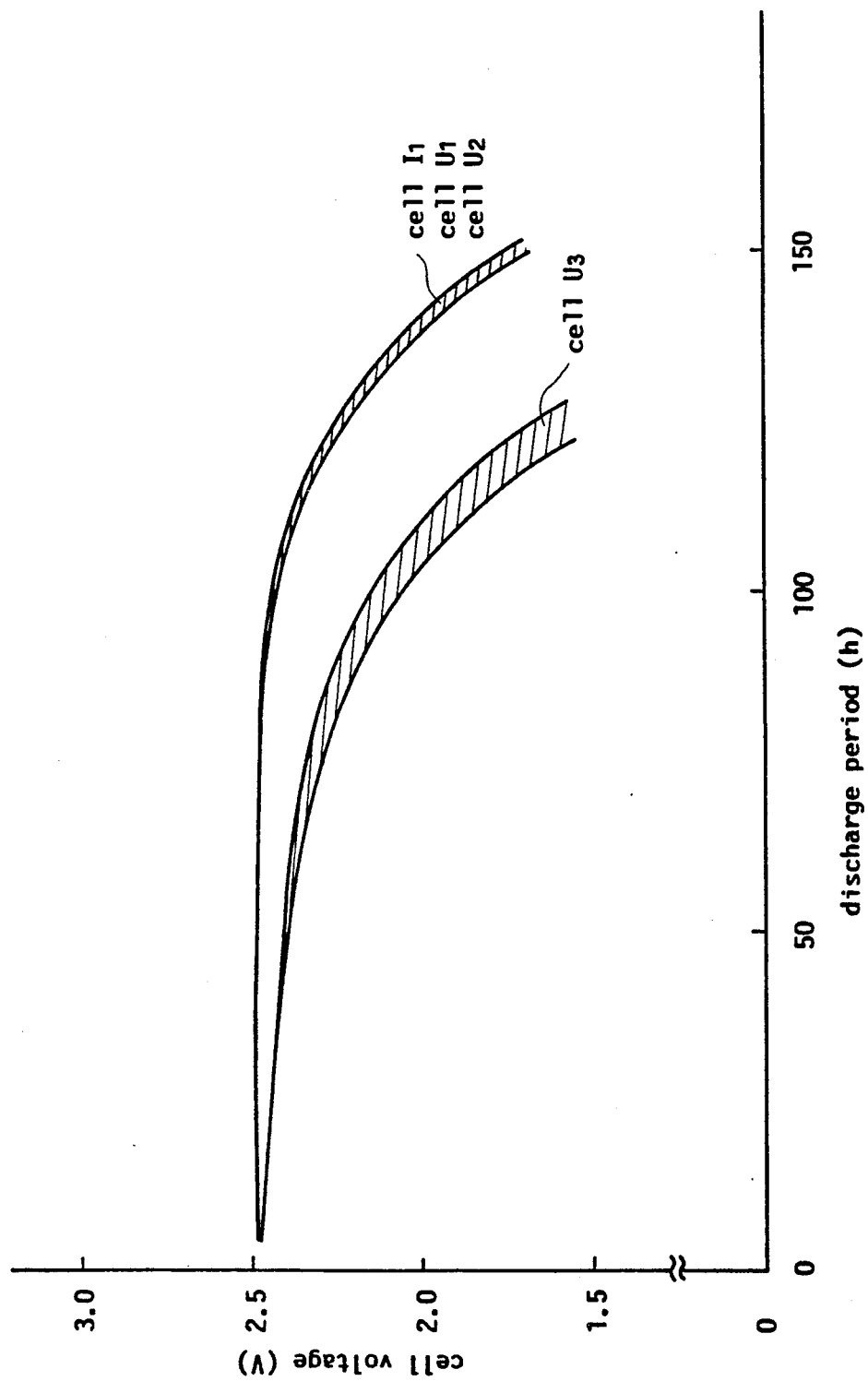
FIG. 29 is a graph showing initial low temperature discharge characteristics of Cells I1 according to the invention and Comparative Cells U1–U3.
Figure 30:
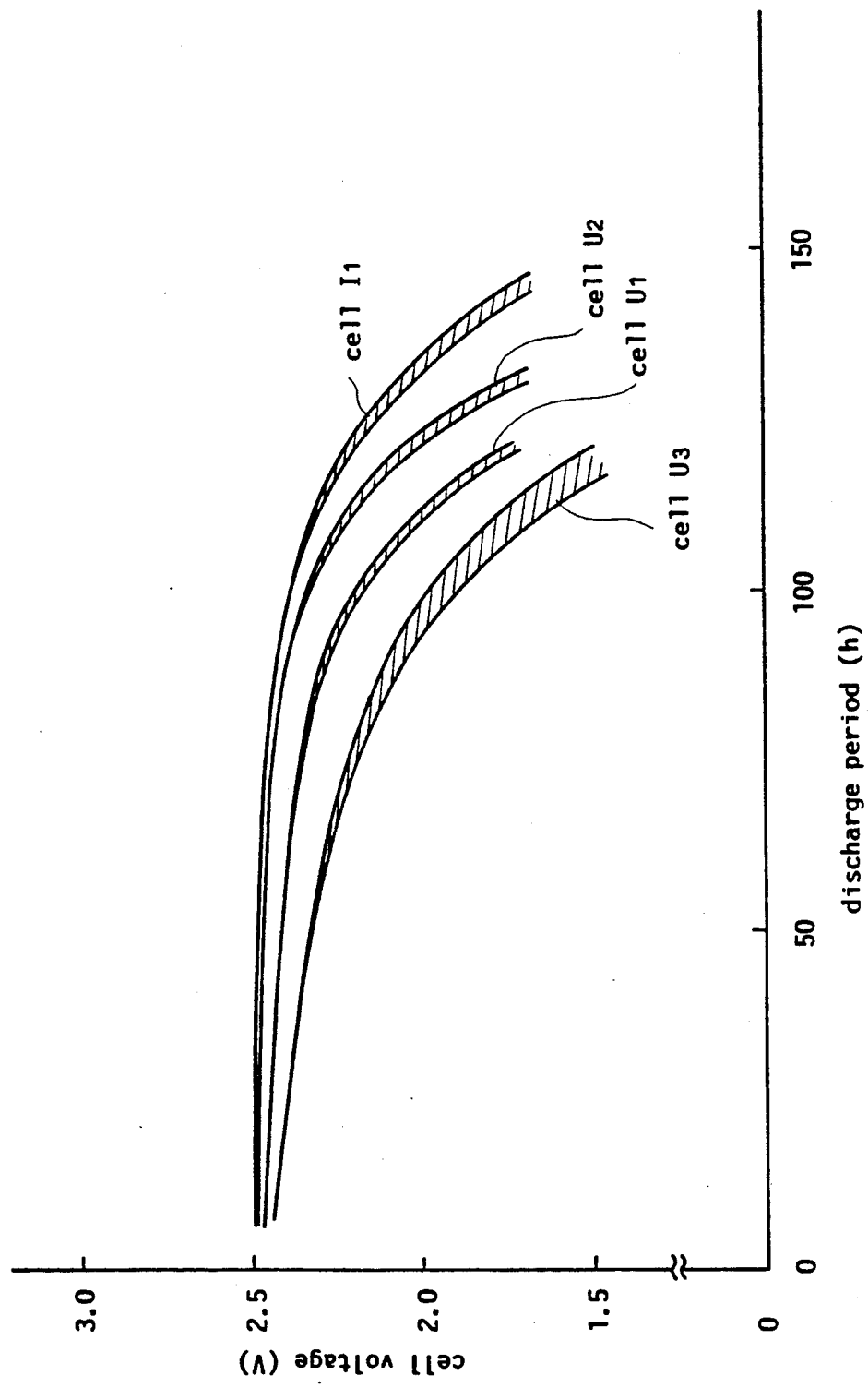
FIG. 30 is a graph showing post-storage low temperature discharge characteristics of Cells I1 and U1–U3.

Initial and post-storage low temperature discharge characteristics of Cells I1 of the present invention and Comparative Cells U1–U3 were checked in the same manner as in Experiment I for the first embodiment, and the results are shown in FIGS. 29 and 30.

As seen from FIG. 29, Cell U3 has poor initial low temperature discharge characteristics. This is considered due to thermal decomposition of lithium trifluoromethanesulfonate occurring when dried at 200° C.

Further, as seen from FIG. 30, not only Cell U3 but Cells U1 and U2 have poor post-storage low temperature discharge characteristics. This is considered due to insufficient removal of moisture during the drying treatment of lithium trifluoromethanesulfonate, and a reaction occurring during the storage between the water and the lithium of the negative electrode.

By contrast, Cell I1 of the present invention shows excellent initial and post-storage low temperature discharge characteristics.

(Experiment II)

The relationship between the lithium trifluoromethanesulfonate drying temperatures in a vacuum (all for 12 hours) and the discharge capacity of the cells after storing the cells at 60° C. for three months was checked by discharging the cells at −20° C. with a resistance of 3KΩ. The results are shown in FIG. 31.

Figure 31:
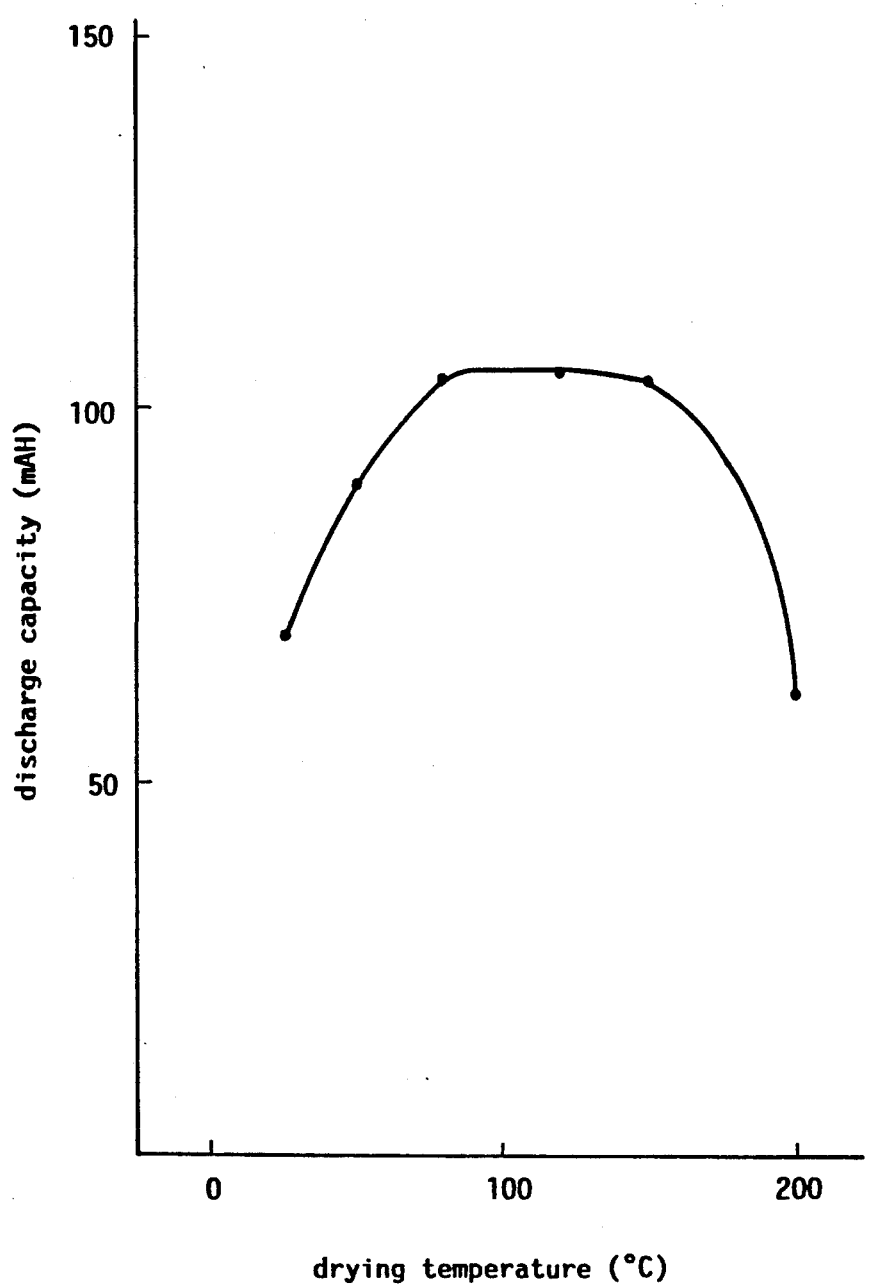
FIG. 31 is a graph showing relationship between drying temperature of lithium trifluoromethanesulfonate and discharge capacity of a cell using lithium trifluoromethanesulfonate.

As seen from FIG. 31, excellent post-storage low temperature discharge characteristics are obtained where lithium trifluoromethanesulfonate is dried at 80°–150° C.

This is believed due to the fact that, where lithium trifluoromethanesulfonate heated and dried at 80°–150° C. is used in cells, lithium trifluoromethanesulfonate does not become decomposed and its moisture is removed sufficiently.

(Example II)

A cell was manufactured in the same way as Example I above excepting that the non-aqueous electrolyte comprised a solvent mixture of ethylene carbonate, butylene carbonate and 1,2-dimethoxyethane, with lithium nitrate added in 1 g/lit. to the electrolyte. Lithium trifluoromethanesulfonate was dissolved in 1 mole/lit. in the solvent mixture.

This cell is hereinafter called Cell I2.

(Comparative Examples IV and V)

Cells were manufactured, for comparison purposed, in the same way as Example II above excepting that the non-aqueous electrolyte comprised solutes consisting of lithium trifluoromethanesulfonate dried at room temperature in a vacuum for 12 hours, and lithium trifluoromethanesulfonate dried at 200° C. in a vacuum for 12 hours, respectively.

These cells are hereinafter called Cells U4 and U5.

(Experiment III)

Figure 32:
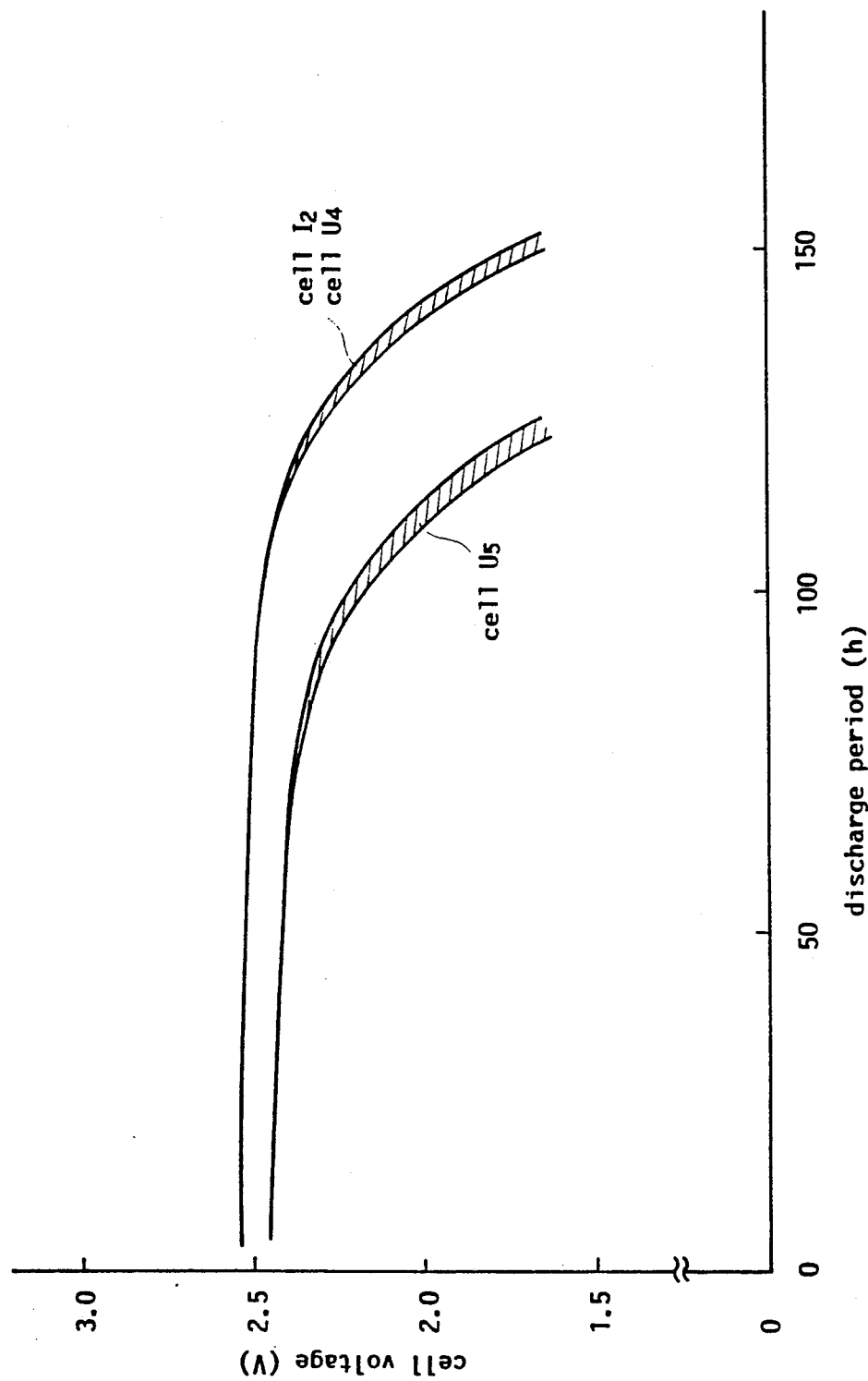
FIG. 32 is a graph showing initial low temperature discharge characteristics of Cells I2 according to the invention and Comparative Cells U4 and U5.
Figure 33:
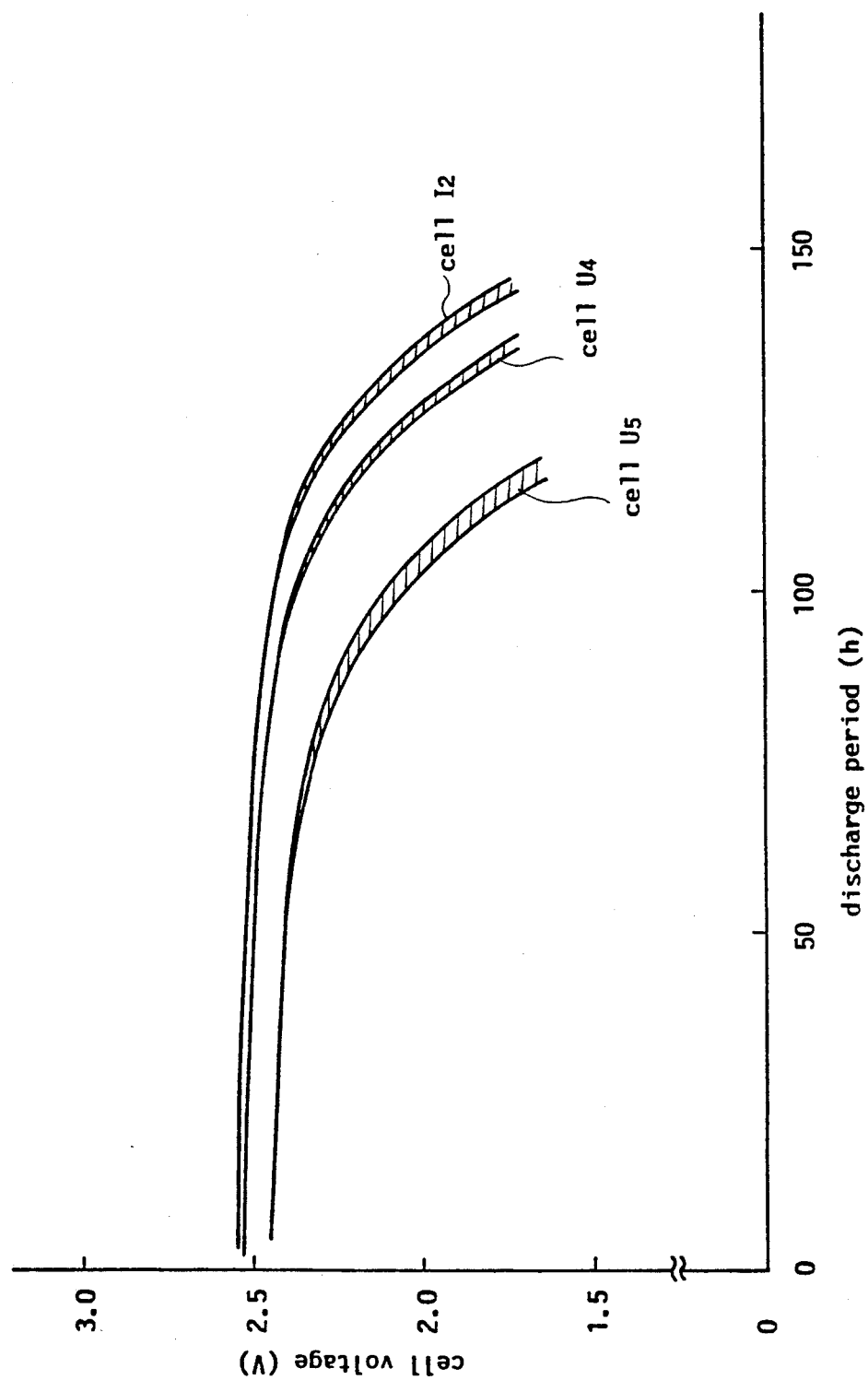
FIG. 33 is a graph showing post-storage low temperature discharge characteristics of Cells I1, U4 and U5.

Initial and post-storage low temperature discharge characteristics of Cells I2 of the present invention and Comparative Cells U4 and U5 were checked in the same manner as in Experiment I for the first embodiment, and the results are shown in FIGS. 32 and 33.

As seen from FIGS. 32 and 33, Cell U5 has poor initial and post-storage low temperature discharge characteristics, while Cell U4 has poor post-storage low temperature discharge characteristics.

By contrast, Cell I2 of the present invention shows excellent initial and post-storage low temperature discharge characteristics.

Further, Cell I2 shows slightly better post-storage low temperature discharge characteristics than Cell I1. This is due to the fact that the two cyclic carbonates included in the solvent of the electrolyte suppress formation of passive films on the negative electrode surface, and lithium nitrate included in the electrolyte suppresses corrosion of the cell cans.

In the first to ninth embodiments described above, the positive electrode comprises manganese dioxide. However, this is not limitative, and similar effects may be produced by positive electrodes comprising other oxides (modified $MnO_2$, densified $MnO_2$, $MNO_2$ containing lithium, $MoO_3$, $CuO$, $CrO_x$, $V_2O_5$, etc.), sulfides ($FeS$, $TiS_2$, $MoS_2$, etc.) and halides ($(CF)n$, etc.).

What is claimed is:

1. A non-aqueous electrolyte cell having a positive electrode comprising lithium, a negative electrode and an electrolyte contained in a cell can, the electrolyte including a solute and an organic solvent, the solute comprising lithium trifluoromethane sulfonate,
   wherein said positive electrode is selected from the group consisting of $MnO_2$, modified $MnO_2$, densified $MnO_2$, $MnO_2$ containing lithium, $MoO_3$, $CuO$, $CrO_x$, $V_2O_5$, $FeS$, $TiS_2$, $MoS_2$, and $(CF)_n$;
   wherein said organic solvent comprises an organic solvent mixture of 5 to 30 volume percent of each of at least two high boiling point solvents including at least one cyclic carbonate.

2. A cell as claimed in claim 1, wherein said organic solvent mixture comprises ethylene carbonate, butylene carbonate and 1,2-dimethyoxyethane.

3. A cell as claimed in claim 1, wherein said organic solvent mixture comprises ethylene carbonate, γ-butyrolactone and 1,2-dimethoxyethane.

4. A cell as claimed in claim 1, wherein said organic solvent mixture comprises propylene carbonate, sulfolane and tetrahydrofuran.

5. A cell as claimed in claim 1, wherein said organic solvent includes at least two cyclic carbonates.

6. A cell as claimed in claim 1,
   wherein said negative electrode comprises a lithium alloy.

7. A cell as claimed in claim 6, wherein said lithium alloy is selected from the group consisting of lithium-aluminum alloy, lithium-indium alloy, lithium-tin alloy, lithium-lead alloy, lithium-bismuth alloy, lithium-gallium alloy, lithium-strontium alloy, lithium-silicon alloy, lithium-zinc alloy, lithium-cadmium alloy, lithium-calcium alloy and lithium-barium alloy.

8. A cell as claimed in claim 1 wherein said electrolyte includes a reaction inhibitor selected from the group consisting of lithium nitrate, triethyl phosphate, tri-n-butyl phosphite, 1,2-diphenyl ethylenediamine, diethyldithiocarbamin, triethyl phosphate, ammonium hypophosphite, and urea orthophosphate added thereto for inhibiting reaction between the cell can and the electrolyte.

9. A cell as claimed in claim 1 wherein said lithium trifluoromethanesulfonate is heated, dried and dehydrated in a vacuum at 80°–150° C.

10. A cell as claimed in claim 6, wherein said negative electrode comprises lithium and about 0.01 to 20 weight percent of at least one non-lithium alloying metal.

* * * * *

UNITED STATES PATENT AND TRADEMARK OFFICE
CERTIFICATE OF CORRECTION

PATENT NO. : 5,112,704

DATED : May 12, 1992

INVENTOR(S) : FURUKAWA et al

It is certified that error appears in the above-identified patent and that said Letters Patent is hereby corrected as shown below:

IN THE DRAWINGS:

In Figure 23, "cell $Z_1$" should read --cell Z--.

Column 14, claim 1, line 35, "positive" should read --negative--.

Column 14, claim 1, line 36, "negative" should read --positive--.

Signed and Sealed this

Twenty-first Day of September, 1993

Attest:

BRUCE LEHMAN

Attesting Officer

Commissioner of Patents and Trademarks